(12) United States Patent
Wertz et al.

(10) Patent No.: US 10,135,051 B2
(45) Date of Patent: Nov. 20, 2018

(54) BATTERY COMPONENTS COMPRISING FIBERS

(71) Applicant: Hollingsworth & Vose Company, East Walpole, MA (US)

(72) Inventors: John A. Wertz, Hollis, NH (US); Nicolas Clement, Littleton, MA (US); Sachin Kumar, Milford, NH (US); Akshay Ashirgade, Northborough, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 97 days.

(21) Appl. No.: 15/380,990

(22) Filed: Dec. 15, 2016

(65) Prior Publication Data

US 2018/0175392 A1    Jun. 21, 2018

(51) Int. Cl.
 *H01M 2/16* (2006.01)
 *H01M 10/06* (2006.01)
 (Continued)

(52) U.S. Cl.
 CPC ......... *H01M 2/1633* (2013.01); *H01M 2/162* (2013.01); *H01M 2/1613* (2013.01);
 (Continued)

(58) Field of Classification Search
 None
 See application file for complete search history.

(56) References Cited

U.S. PATENT DOCUMENTS

| 5,290,645 | A | 3/1994 | Tanaka et al. |
| 6,495,286 | B2 * | 12/2002 | Zguris ................ H01M 2/1613 429/142 |

(Continued)

FOREIGN PATENT DOCUMENTS

| EP | 1 617 495 A1 | 1/2006 |
| JP | H06-325744 A | 11/1994 |

(Continued)

OTHER PUBLICATIONS

International Search Report and Written Opinion for PCT/US2017/066057 dated Apr. 20, 2018.

(Continued)

*Primary Examiner* — Alix E Eggerding
(74) *Attorney, Agent, or Firm* — Wolf, Greenfield & Sacks, P.C.

(57) ABSTRACT

Battery components are generally provided. In some embodiments, the battery components can be used as pasting paper and/or capacitance layers for batteries, such as lead acid batteries. The battery components described herein may comprise a plurality of fibers. The battery component may include, in some embodiments, a plurality of fibers and, optionally, one or more additives such as conductive carbon and/or activated carbon. In certain embodiments, the plurality of fibers include relatively coarse glass fibers (e.g., having an average diameter of greater than or equal to 2 microns), relatively fine glass fibers (e.g., having an average diameter of less than 2 microns), and/or fibrillated fibers. In some instances, such fibers may be present in amounts such that the battery component has a particular surface area, mean pore size, and/or dry tensile strength.

23 Claims, 3 Drawing Sheets

(51) Int. Cl.
*H01M 4/14* (2006.01)
*H01M 4/20* (2006.01)

(52) U.S. Cl.
CPC .............. *H01M 4/14* (2013.01); *H01M 4/20* (2013.01); *H01M 10/06* (2013.01); *H01M 2/1646* (2013.01); *H01M 2/1653* (2013.01)

(56) References Cited

U.S. PATENT DOCUMENTS

| | | | |
|---|---|---|---|
| 7,742,279 B2 | 6/2010 | Takahashi et al. | |
| 9,117,596 B2 | 8/2015 | Loganathan et al. | |
| 9,203,116 B2 | 12/2015 | Lam et al. | |
| 9,293,748 B1 | 3/2016 | Ashirgade et al. | |
| 9,401,508 B2 | 7/2016 | Lam et al. | |
| 9,577,236 B2 | 2/2017 | Ashirgade et al. | |
| 9,627,668 B1 | 4/2017 | Ashirgade et al. | |
| 9,728,756 B2 | 8/2017 | Ashirgade et al. | |
| 9,786,885 B2 | 10/2017 | Jiang | |
| 2003/0180622 A1* | 9/2003 | Tsukuda | D21H 15/02 429/249 |
| 2008/0199737 A1 | 8/2008 | Kazaryan et al. | |
| 2012/0028126 A1 | 2/2012 | Zguris et al. | |
| 2012/0070727 A1 | 3/2012 | Wertz et al. | |
| 2012/0070728 A1 | 3/2012 | Wertz et al. | |
| 2012/0070729 A1 | 3/2012 | Wertz et al. | |
| 2012/0160104 A1 | 6/2012 | Vulfson | |
| 2012/0258336 A1 | 10/2012 | Jun et al. | |
| 2013/0071723 A1 | 3/2013 | Wertz et al. | |
| 2013/0071734 A1 | 3/2013 | Wertz et al. | |
| 2013/0071735 A1 | 3/2013 | Wertz et al. | |
| 2014/0186712 A1 | 7/2014 | Albano et al. | |
| 2014/0227585 A1 | 8/2014 | Wertz et al. | |
| 2014/0272535 A1 | 9/2014 | Clement et al. | |
| 2015/0099153 A1 | 4/2015 | Guo et al. | |
| 2015/0099189 A1 | 4/2015 | Ketzer et al. | |
| 2016/0079581 A1 | 3/2016 | Ashirgade et al. | |
| 2016/0149183 A1* | 5/2016 | Keisler | H01M 2/1613 429/247 |
| 2016/0164058 A1 | 6/2016 | Ashirgade et al. | |
| 2016/0268567 A1* | 9/2016 | Guo | H01M 2/145 |
| 2016/0301053 A1 | 10/2016 | Jiang | |
| 2017/0092917 A1 | 3/2017 | Ashirgade et al. | |
| 2017/0098810 A1* | 4/2017 | Whear | H01M 2/145 |
| 2017/0170442 A1 | 6/2017 | Ashirgade et al. | |
| 2017/0179454 A1 | 6/2017 | Natesh et al. | |
| 2017/0294639 A1 | 10/2017 | Natesh | |
| 2017/0373293 A1 | 12/2017 | Jiang | |
| 2018/0026247 A1 | 1/2018 | Ashirgade et al. | |
| 2018/0047964 A1 | 2/2018 | Natesh et al. | |

FOREIGN PATENT DOCUMENTS

| | | |
|---|---|---|
| JP | 2546240 B2 | 10/1996 |
| WO | WO 2012/040395 A2 | 3/2012 |

OTHER PUBLICATIONS

U.S. Appl. No. 15/510,339, filed Mar. 10, 2017, Natesh.
U.S. Appl. No. 15/127,057, filed Sep. 19, 2016, Natesh.
U.S. Appl. No. 13/834,597, filed Mar. 15, 2013, Clement et al.
U.S. Appl. No. 13/239,273, filed Sep. 21, 2011, Wertz et al.
U.S. Appl. No. 15/427,208, filed Feb. 8, 2017, Ashirgade et al.
U.S. Appl. No. 14/550,413, filed Nov. 21, 2014, Keisler et al.
U.S. Appl. No. 14/683,565, filed Apr. 10, 2015, Jiang.
U.S. Appl. No. 15/359,902, filed Nov. 23, 2016, Vulfson et al.
Turbak, Nonwovens: Theory, Process, Performance, and Testing. Tappi Press 1993. Excerpt pp. 144-147.
Zguris et al., Nonwovens Battery Separators to improve performance in lead acid battery systems. Mabat Conference. Warsaw, Poland. Jul. 24, 1991. 17 pages.

* cited by examiner

BATTERY COMPONENTS COMPRISING FIBERS

FIELD OF INVENTION

The present embodiments relate generally to battery components, and specifically, to battery components that can be used as pasting paper and/or capacitance layers for batteries, such as lead acid batteries.

BACKGROUND

Batteries convert stored chemical energy into electrical energy and are commonly used as energy sources. Typically, a battery comprises one or more electrochemical cells including a negative electrode, a positive electrode, an electrolyte, and one or more battery components. For example, a battery may comprise a battery component such as pasting paper and/or a capacitance layer. Pasting paper is generally used to support wet lead paste during the manufacturing process of electrochemical cells in lead acid batteries including VRLA batteries. Capacitance layers generally provide a reservoir of electrons for batteries which provides quick initial discharges and recharge pulses.

Such battery components should be chemically, mechanically, and electrochemically stable under the strongly reactive environments in the battery during operation, should not adversely interact with the electrolyte and/or electrode materials, and have no deleterious effect on the battery's performance (e.g., energy production, cycle life, safety). For example, the battery component should not degrade, leach harmful components, react in a negative way with the electrode materials, allow short circuits to form between the electrodes, and/or crack or break during battery assembly and/or operation. Batteries components also play a role in determining the assembly speed of the battery, as well as the performance during service. For example, during assembly, the properties of pasting paper may affect its processability. Though many battery components exist, improvements are needed.

SUMMARY

The present embodiments relate generally to battery components, and specifically, to battery components that can be used as pasting paper and/or capacitance layers for batteries, such as lead acid batteries.

In one aspect, battery components are provided. In some embodiments, the battery component comprises a plurality of fine glass fibers having an average fiber diameter of less than 2 microns, wherein the plurality of fine glass fibers are present in an amount greater than or equal to 30 wt % and less than or equal to 60 wt % versus the total weight of the battery component. The battery component also comprises a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component. The battery component also comprises a plurality of fibrillated fibers present in an amount greater than or equal to 1 wt % and less than or equal to 15 wt % versus the total weight of the battery component. The battery component also comprises a resin present in an amount greater than or equal to 1 wt % and less than or equal to 10 wt % versus the total weight of the battery component. The battery component also comprises a plurality of bicomponent fibers present in an amount of greater than 0 wt % and less than or equal to 8 wt % versus the total weight of the battery component.

In some embodiments, the battery component comprises a plurality of fine glass fibers having an average fiber diameter of less than 2 microns, wherein the plurality of fine glass fibers are present in an amount greater than or equal to 30 wt % and less than or equal to 60 wt % versus the total weight of the battery component. The battery component also comprises a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component. The battery component also comprises a plurality of fibrillated fibers present in an amount greater than or equal to 1 wt % and less than or equal to 15 wt % versus the total weight of the battery component. The battery component also comprises a resin present in an amount greater than or equal to 1 wt % and less than or equal to 10 wt % versus the total weight of the battery component. The battery component has an air permeability of greater than or equal to 1 CFM and less than or equal to 1000 CFM.

In some embodiments, the battery component comprises a plurality of fine glass fibers having an average fiber diameter of less than 2 microns, wherein the plurality of fine glass fibers are present in an amount greater than or equal to 30 wt % and less than or equal to 60 wt % versus the total weight of the battery component. The battery component also comprises a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component. The battery component also comprises a plurality of fibrillated fibers present in an amount greater than or equal to 1 wt % and less than or equal to 15 wt % versus the total weight of the battery component. The battery component also comprises a resin present in an amount greater than or equal to 1 wt % and less than or equal to 10 wt % versus the total weight of the battery component, wherein the resin is hydrophobic.

In some embodiments, the battery component comprises a plurality of fine glass fibers having an average fiber diameter of less than 2 microns, a plurality of coarse glass fibers having an average fiber diameter of greater than or equal to 2 microns, and a plurality of fibrillated fibers. The battery component has a surface area of greater than or equal to 0.5 $m^2$/g and less than or equal to 100 $m^2$/g. The battery component has a mean pore size of greater than or equal to 0.1 microns and less than or equal to 15 microns. The battery component has a dry tensile strength in the machine direction of greater than or equal to 0.1 lbs. per inch and less than or equal to 15 lbs. per inch.

In some embodiments, the battery component comprises a layer comprising a plurality of glass fibers, conductive carbon, activated carbon, a binder, and a hydrogen suppressant. The conductive carbon and the activated carbon form a total carbon, and the total carbon in the battery component is present in an amount of greater than or equal to 80 wt % and less than or equal to 90 wt % versus the total weight of the battery component. The plurality of glass fibers are present within the battery component in an amount of greater than 0 wt % and less than or equal to 95 wt % versus the total weight of the battery component. The binder is present in the battery component in an amount of less than or equal to 5 wt % and greater than or equal to 1 wt % versus the total weight of the battery component. The hydrogen suppressant is present in the battery component in an amount greater than or equal to 0.1 wt % and less than or equal to 10 wt % versus the total weight of the battery component. The ratio of activated carbon to conductive carbon is greater than or equal to 70:30 and less than or equal to 99:1.

In another aspect, battery plates are provided. In some embodiments, the battery plate comprises a lead grid and a battery component, such as one described above or herein.

In yet another aspect, lead acid batteries are provided. In some embodiments, the lead acid battery comprises a negative plate, a positive plate, and a battery component (such as one described above or herein) disposed between the negative and positive plates.

In some embodiments, the battery component described above and/or herein comprises activated carbon. In some embodiments, the battery component comprises conductive carbon. In some embodiments, the ratio of activated carbon to conductive carbon is greater than or equal to 90:10 and less than or equal to 94:6. In some embodiments, the activated carbon and/or conductive carbon is deposited on the battery component. In some embodiments, the activated carbon and/or conductive carbon is present within the battery component.

In some embodiments, the battery component described above and/or herein comprises a hydrogen suppressant in an amount of less than or equal to 2 wt % versus the total weight of the battery component. In some embodiments, the hydrogen suppressant is selected from the group consisting of oxides, hydroxides, sulfates, tin, titanium, cobalt, antimony, and combinations thereof.

In some embodiments, the total weight of fine glass fibers and coarse glass fibers is less than or equal to 98 wt % versus the total weight of the battery component described above and/or herein. In some embodiments, the plurality of fine glass fibers have an average fiber diameter of less than or equal to 1 micron. In some embodiments, the plurality of coarse glass fibers have an average fiber diameter of greater than 5 microns. In some embodiments, the plurality of fibrillated fibers have an average length of less than or equal to 25 mm. In some embodiments, the plurality of fibrillated fibers have a Canadian Standard Freeness (CSF) of greater than or equal to 20 CSF and less than or equal to 650 CSF. In some embodiments, the plurality of fibrillated fibers comprise cellulose-based fibers, acrylics, liquid crystalline polymers, polyoxazoles, aramids, p-aramids, polyethylenes, polyesters, polyamides, cotton, polyolefins, and/or olefins.

In some embodiments, the resin in the battery component described above and/or herein is a hydrophobic resin. In some embodiments, the resin has a contact angle of greater than 90 degrees, according to standard ASTM D5946 (2009).

In some embodiments, the battery component described above and/or herein has a Cobb parameter of greater than or equal to 50 gsm.

In some embodiments, the battery component described above and/or herein has a basis weight of greater than or equal to 10 g/m² and less than or equal to 200 g/m². In some embodiments, the battery component described above and/or herein has an average thickness of greater than or equal to 0.1 mm and less than or equal to 0.6 mm. In some embodiments, the battery component described above and/or herein has a specific surface area of greater than or equal to 0.2 m²/g and less than or equal to 5 m²/g. In some embodiments, the battery component described above and/or herein has a maximum pore size greater than or equal to 5 microns and less than or equal to 100 microns. In some embodiments, the battery component described above and/or herein has a mean pore size of greater than or equal to 0.1 microns and less than or equal to 15 microns.

In some embodiments, the battery component described above and/or herein has a dry tensile strength of greater than or equal to 0.1 pounds per inch and less than or equal to 15 pounds per inch.

In some embodiments, the ratio of activated carbon to conductive carbon in the battery component described above and/or herein is greater than or equal to 90:10 and less than or equal to 94:6.

In some embodiments, the plurality of glass fibers are present within the battery component described above and/or herein in an amount of greater than or equal to 85 wt % and less than or equal to 95 wt %. in some embodiments, the plurality of glass fibers are present within the battery component described above and/or herein in an amount of greater than or equal to 5 wt % and less than or equal to 50 wt %.

In some embodiments, the binder in the battery component described above and/or herein is selected from the group consisting of PTFE, CMC, SBR, acrylic, PVDF, and combinations thereof.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figure, which is schematic and is not intended to be drawn to scale. In the figure, each identical or nearly identical component illustrated is typically represented by a single numeral. For purposes of clarity, not every component is labeled, nor is every component of each embodiment of the invention shown where illustration is not necessary to allow those of ordinary skill in the art to understand the invention. In the figures.

DETAILED DESCRIPTION

Figure 1:
FIG. 1 is a schematic diagram of a battery component including a fiber layer according to one set of embodiments.

Battery components are generally provided. In some embodiments, the battery components can be used as pasting paper and/or capacitance layers for batteries, such as lead acid batteries. The battery components described herein may comprise a plurality of fibers. The battery component may include, in some embodiments, a plurality of fibers and, optionally, one or more additives such as conductive carbon and/or activated carbon. In some embodiments, the plurality of fibers include relatively coarse glass fibers (e.g., having an average diameter of greater than or equal to 2 microns), relatively fine glass fibers (e.g., having an average diameter of less than 2 microns), and/or fibrillated fibers. In some instances, such fibers may be present in amounts such that the battery component has a particular surface area, mean pore size, and/or dry tensile strength.

In some cases, the battery component may be useful as a pasting paper in an electrochemical cell. Advantageously, the combination of glass fibers and fibrillated fibers within a battery component having features described herein (e.g., a pasting paper) may exhibit a balance between resistance to acid stratification, ease of processability (e.g., mechanical manipulation), and increased paste adhesion. By contrast, pasting paper including all glass fibers may exhibit poor adhesion to an electroactive material and/or may be susceptible to damage (e.g., tearing, puncturing) during processing. Pasting paper comprising primarily cellulose-based fibers may exhibit poor resistance to acid stratification and/or leaching of undesirable organic contaminants into an electrolyte in the electrochemical cell, since cellulose may dissolve in the electrolyte. Moreover, dissolution of components of the pasting paper in the electrolyte frees up space previously occupied by the paper, resulting in decreased pressure inside the battery, and can lead to reduced cycle life of the battery.

In some embodiments, a battery component described herein may be conductive. For example, in some embodiments, the battery component comprises one or more additives such as activated carbon and/or conductive carbon. In some embodiments, the conductive battery component may be useful as a conductive layer or capacitance layer within an electrochemical cell (e.g., a layer capable of storing non-faradic charge in or on the layer). Without wishing to be bound by theory, such conductive battery components may provide a readily available source of electrons within a battery. The battery component may advantageously result in a reduction of delay of initial discharge of the battery, replenish freshly discharged active material, improve charge acceptance, and/or lead to an increase in the lifetime of the battery.

In some embodiments, such improvements may be achieved while having relatively minimal or no adverse effects on another property of the battery component and/or the overall battery. The battery components described herein may be well suited for a variety of battery types, including lead acid batteries.

A non-limiting example of a battery component including a plurality of fibers is shown schematically in FIG. 1. A battery component 5 may include a fiber layer 6 comprising a plurality of fibers. In some embodiments, the fiber layer includes a plurality of glass fibers (e.g., a plurality of coarse glass fibers, a plurality of fine glass fibers) and/or a plurality of fibrillated fibers. The fiber layer may also include a plurality of synthetic fibers, such as monocomponent and/or bicomponent fibers, and/or a resin. In some embodiments, the battery component may be a single layer (e.g., the component does not include layer 7 in FIG. 1). For instance, the battery component may be formed of a single fiber layer.

In other embodiments, the battery component may comprise multiple layers. For instance, in addition to fiber layer 6, the battery separator may include an optional layer 7 (e.g., additional layer), which may be adjacent the fiber layer (e.g., contacting one or more sides of the fiber layer). In some embodiments, the multi-layer battery component may include at least one fiber layer (e.g., at least two fiber layers, at least three fiber layers), with at least one fiber layer including a plurality of glass fibers and a plurality of fibrillated fibers, as described herein.

As used herein, when a layer is referred to as being "adjacent" another layer, it can be directly adjacent to the layer, or an intervening layer also may be present. A layer that is "directly adjacent" another layer means that no intervening layer is present.

In some embodiments, one or more optional layers (e.g., additional layers) may be present in the battery component. Non-limiting examples of optional/additional layers include fiber layers such as those comprising a plurality of glass fibers, which optionally include activated carbon particles and conductive carbon particles. In some embodiments, however, the one or more optional layers may be substantially free of activated carbon and conductive carbon particles. Other types of layers are also possible. For example, in some cases, the one or more optional layers may include a battery grid (e.g., a lead grid).

It should be understood that the configurations of the layers shown in the figures are by way of example only, and that in other embodiments, battery components including other configurations of layers may be possible. Furthermore, in some embodiments, additional layers may be present in addition to the ones shown in the figures. It should also be appreciated that not all components shown in the figures need be present in some embodiments.

In some embodiments, the battery component comprises a fiber layer that is positioned adjacent (e.g., directly adjacent) a battery grid (e.g., a lead grid). In some embodiments, formation of a portion of the battery may involve positioning (e.g., via a conveyer belt) a fiber layer adjacent a battery grid and adding a paste (e.g., a paste mixture comprising one or more of electroactive material, lead oxide, pure lead, carbon, sulfuric acid, sodium lignosulfonate, graphite, expanded graphite, carbon black, barium sulfate, lead sulfate, and/or a plurality of fibers such as glass fibers, PET fibers, and/or cellulose fibers) such that the fiber layer adheres to the battery grid. In some embodiments, the battery component comprises a first fiber layer and a second fiber layer. The first fiber layer may be adjacent a first surface of the battery grid and the second fiber layer may be adjacent a second surface of the battery grid.

Advantageously, the fiber layer(s) described herein may have a sufficient tensile strength and may comprises a combination of fibers such that the fiber layer is not damaged during the formation and/or use of the battery component (e.g., during charge/discharge of the electrochemical cell comprising the battery component). The fiber layer(s) may be designed to be retained within the battery throughout the lifetime of the battery. In some embodiments, the mean pore size of the fiber layer is tailored such that the fiber layer has good adhesion to the battery grid (e.g., via embedding in active material paste) after processing. The fiber layer(s) may be designed to have a balance of properties including tensile strength, mean pore size, and specific surface area such that a battery component comprising the fiber layer has desirable adhesive properties, mechanical robustness, and desirable resistance to acid stratification.

In some embodiments, a fiber layer includes a plurality of glass fibers (e.g., fine glass fibers, coarse glass fibers). In some embodiments, the fiber layer may also comprise a plurality of fibrillated fibers, although fibrillated fibers need not be present in some embodiments. Accordingly, in some embodiments fibrillated fibers are absent from a battery component described herein.

As described herein, the battery component may include a plurality of fine glass fibers. The plurality of fine glass fibers in the battery component generally have an average fiber diameter of less than 2 microns. For example, in some embodiments, the plurality of fine glass fibers have an average fiber diameter of less than 2 microns, less than or equal to 1.75 microns, less than or equal to 1.5 microns, less than or equal to 1.25 microns, less than or equal to 1 microns, less than or equal to 0.5 microns, or less than or equal to 0.2 microns. In some embodiments, the plurality of fine glass fibers have an average fiber diameter of greater than or equal to 0.1 microns, greater than or equal to 0.2 microns, greater than or equal to 0.5 microns, greater than or equal to 1 micron, or greater than or equal to 1.5 microns. Combinations of the above-referenced ranges are possible (e.g., less than 2 microns and greater than or equal to 0.1 microns, less than or equal to 1.5 microns and greater than or equal to 0.5 microns). Other ranges are also possible. In some embodiments, the plurality of fine glass fibers are a plurality of microglass fibers. Other types of fibers having an average fiber diameter of less than or 2 microns are also possible.

In some embodiments, the plurality of fine glass fibers are present in the battery component (or in a fiber layer of the battery component) in an amount greater than or equal to 30 wt %, greater than or equal to 35 wt %, greater than or equal to 40 wt %, greater than or equal to 45 wt %, greater than or equal to 50 wt %, or greater than or equal to 55 wt % versus the total weight of the battery component (or a fiber layer of the battery component). In some embodiments, the plurality of fine glass fibers are present in the battery component (or in a fiber layer of the battery component) in an amount less than or equal to 60 wt %, less than or equal to 55 wt %, less than or equal to 50 wt %, less than or equal to 45 wt %, or less than or equal to 35 wt % versus the total weight of the battery component (or a fiber layer of the battery component). Combinations of the above referenced ranges are possible (e.g., greater than or equal to 30 wt % and less than or equal to 60 wt %, greater than or equal to 35 wt % and less than or equal to 55 wt %, greater than or equal to 40 wt % and less than or equal to 50 wt %). Other ranges are also possible.

As described herein, the battery component (or a fiber layer of the battery component) may include a plurality of coarse glass fibers. The plurality of coarse glass fibers generally have an average fiber diameter of greater than or equal to 2 microns. For example, in certain embodiments, the plurality of coarse glass fibers have an average fiber diameter of greater than or equal to 2 microns, greater than or equal to 5 microns, greater than or equal to 7 microns, greater than or equal to 10 microns, greater than or equal to 12 microns, greater than or equal to 15 microns, greater than or equal to 17 microns, greater than or equal to 20 microns, greater than or equal to 25 microns, greater than or equal to 30 microns, greater than or equal to 35 microns, or greater than or equal to 40 microns. In some embodiments, the plurality of coarse glass fibers have an average fiber diameter of less than or equal to 50 microns, less than or equal to 40 microns, less than or equal to 30 microns, less than or equal to 20 microns, less than or equal to 15 microns, less than or equal to 10 microns, or less than or equal to 5 microns. Combinations of the above referenced ranges are possible (e.g., greater than or equal to 2 microns and less than or equal to 50 microns, greater than or equal to 2 microns and less than or equal to 15 microns). Other ranges are also possible. In some embodiments, the plurality of coarse glass fibers may comprise, or are, a plurality of chopped strand fibers, which are described in more detail below.

In some embodiments, the plurality of coarse glass fibers are present in the battery component (or in a fiber layer of the battery component) in an amount greater than or equal to 30 wt %, greater than or equal to 35 wt %, greater than or equal to 40 wt %, greater than or equal to 45 wt %, greater than or equal to 50 wt %, or greater than or equal to 55 wt % versus the total weight of the battery component (or a fiber layer of the battery component). In certain embodiments, the plurality of coarse glass fibers are present in the battery component (or in a fiber layer of the battery component) in an amount less than or equal to 60 wt %, less than or equal to 55 wt %, less than or equal to 50 wt %, less than or equal to 45 wt %, or less than or equal to 35 wt % versus the total weight of the battery component (or a fiber layer of the battery component). Combinations of the above referenced ranges are possible (e.g., greater than or equal to 30 wt % and less than or equal to 60 wt %, greater than or equal to 35 wt % and less than or equal to 55 wt %, greater than or equal to 40 wt % and less than or equal to 50 wt %) versus the total weight of the battery component (or a fiber layer of the battery component). Other ranges are also possible.

In some embodiments, the total weight of all glass fibers (e.g., comprising coarse and fine glass fibers) present in the battery component (or in a fiber layer of the battery component) is greater than or equal to 60 wt %, greater than or equal to 65 wt %, greater than or equal to 70 wt %, greater than or equal to 75 wt %, greater than or equal to 80 wt %, greater than or equal to 85 wt %, greater than or equal to 90 wt %, or greater than or equal to 95 wt % versus the total weight of the battery component (or a fiber layer of the battery component). In certain embodiments, the total weight of all glass fibers present in the battery component is less than or equal to 98 wt %, less than or equal to 95 wt %, less than or equal to 90 wt %, less than or equal to 85 wt %, less than or equal to 80 wt %, less than or equal to 75 wt %, or less than or equal to 70 wt % versus the total weight of the battery component (or a fiber layer of the battery component). Combinations of the above-referenced ranges are possible (e.g., greater than or equal to 60 wt % and less than or equal to 98 wt %, greater than or equal to 65 wt % and less than or equal to 95 wt %, greater than or equal to 70 wt % and less than or equal to 95 wt %). Other ranges are also possible.

In some embodiments, the plurality of fine glass fibers may have a particular average length. In some embodiments, the average length of the plurality of fine glass fibers is greater than or equal to 0.001 mm, greater than or equal to 0.01 mm, greater than or equal to 0.05 mm, greater than or equal to 0.1 mm, greater han or equal to 0.5 mm, greater than or equal to 1 mm, greater than or equal to 2 mm, or greater than or equal to 5 mm. In certain embodiments, the average length of the plurality of fine glass fibers is less than or equal to 10 mm, less than or equal to 5 mm, less than or equal to 2 mm, less than or equal to 1 mm, less than or equal to 0.5 mm, less than or equal to 0.1 mm, less than or equal to 0.05 mm, or less than or equal to 0.01 mm. Combinations of the above-referenced ranges are possible (e.g., greater than or equal to 0.001 mm and less than or equal to 10 mm, greater than or equal to 0.01 mm and less than or equal to 5 mm). Other ranges are also possible.

In some embodiments, the plurality of coarse glass fibers may have a particular average length. In some embodiments, the average length of the plurality of coarse glass fibers is greater than or equal to 0.01 mm, greater than or equal to 0.05 mm, greater than or equal to 0.1 mm, greater than or equal to 0.5 mm, greater than or equal to 1 min, greater than or equal to 2 mm, greater than or equal to 5 mm, greater than or equal to 10 mm, greater than or equal to 15 mm, or greater than or equal to 20 mm. In certain embodiments, the average length of the plurality of coarse glass fibers is less than or equal to 25 mm, less than or equal to 20 mm, less than or equal to 15 mm, less than or equal to 10 mm, less than or equal to 5 mm, less than or equal to 2 mm, less than or equal to 1 mm, or less than or equal to 0.5 mm. Combinations of the above-referenced ranges are possible (e.g., greater than or equal to 0.01 mm and less than or equal to 25 mm, greater than or equal to 0.1 mm and less than or equal to 15 mm). Other ranges are also possible.

In certain embodiments, the battery component (or a fiber layer of the battery component) may include microglass fibers, chopped strand glass fibers, or a combination thereof. Microglass fibers and chopped strand glass fibers are known to those skilled in the art. One skilled in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than 2 micron in diameter and coarse microglass fibers are greater than or equal to 2 microns in diameter.

The microglass fibers of the battery component (or a fiber layer of the battery component) may can have small diameters such as less than 10.0 microns. For example, the average diameter of the microglass fibers in a battery component or layer may be less than or equal to 9.0 microns, less than or equal to 7.0 microns, less than or equal to 5.0 microns, less than or equal to 3.0 microns, or less than or equal to 1.0 microns. The average diameter of the microglass fibers in a battery component or layer may be at least 0.1 microns, at least 0.3 microns, at least 0.5 microns, at least 1 micron, at least 3 microns, at least 5 microns, or at least 7 microns. Combinations of the above-referenced ranges are also possible (e.g., at least 0.1 microns and less than or equal to 9.0 microns, at least 1 micron and less than or equal to 5.0 microns). Other values are also possible. Average diameter distributions for microglass fibers are generally log-normal. However, it can be appreciated that microglass fibers may be provided in any other appropriate average diameter distribution (e.g., Gaussian distribution).

The microglass fibers may vary significantly in length as a result of process variations. The aspect ratios (length to diameter ratio) of the microglass fibers in a layer may be generally in the range of about 100 to 10,000. In some embodiments, the aspect ratios of the microglass fibers in a layer are in the range of about 200 to 2500; or, in the range of about 300 to 600. In some embodiments, the average aspect ratio of the microglass fibers in a layer may be about 1,000, or about 300. It should be appreciated that the above-noted dimensions are not limiting and that the microglass fibers may also have other dimensions.

Non-limiting examples of microglass fibers are M-glass fibers according to Man Made Vitreous Fibers by Nomenclature Committee of TIMA Inc. March 1993, Page 45.

Coarse microglass fibers may be included within a battery component (or a fiber layer of the battery component) in any suitable amount with respect to the total weight of the glass fibers. In some embodiments, coarse microglass fibers are present in an amount greater than or equal to 20 wt %, greater than or equal to 30 wt %, greater than or equal to 40 wt %, greater than or equal to 50 wt %, greater than or equal to 60 wt %, greater than or equal to 70 wt %, or greater than or equal to 80 wt % with respect to the total weight of the glass fibers. In certain embodiments, the coarse microglass fibers are present in an amount less than or equal to 90 wt %, less than or equal to 80 wt %, less than or equal to 70 wt %, less than or equal to 60 wt %, less than or equal to 50 wt %, less than or equal to 40 wt %, or less than or equal to 30 wt % with respect to the total weight of the glass fibers. Combinations of the above referenced ranges are possible (e.g., greater than or equal to 30 wt % and less than or equal to 60 wt %). Other ranges are also possible.

Fine microglass fibers may be included within a battery component (or a fiber layer of the battery component) in any suitable amount with respect to the total weight of the glass fibers. In some embodiments, fine microglass fibers are present in an amount of 0%, greater than or equal to 5 wt %, greater than or equal to 10 wt %, greater than or equal to 20 wt %, greater than or equal to 30 wt %, greater than or equal to 40 wt %, greater than or equal to 50 wt %, or greater than or equal to 60 wt % with respect to the total weight of the glass fibers. In certain embodiments, the fine microglass fibers are present in an amount less than or equal to 70 wt %, less than or equal to 60 wt %, less than or equal to 50 wt %, less than or equal to 40 wt %, less than or equal to 30 wt %, less than or equal to 20 wt % or less than or equal to 10 wt % with respect to the total weight of the glass fibers. Combinations of the above referenced ranges are possible (e.g., greater than or equal to 30 wt % and less than or equal to 60 wt %). Other ranges are also possible.

The chopped strand glass fibers may have an average fiber diameter that is greater than the diameter of the microglass fibers. In some embodiments, the chopped strand glass fibers have a diameter of at least 5.0 microns, e.g., up to 30.0 microns. For instance, the chopped strand glass fibers may have a diameter of at least 6.0 microns, at least 8.0 microns, at least 10.0 microns, at least 15.0 microns, at least 20.0 microns, or at least 25.0 microns, In some embodiments, the chopped strand glass fibers may have a fiber diameter of less than or equal to 30.0 microns, less than or equal to 25.0 microns, less than or equal to 20.0 microns. less than or equal to 15.0 microns, less than or equal to 12.0 microns, less than or equal to 10.0 microns, less than or equal to 8.0 microns, or less than or equal to 6.0 microns. Combinations of the above-referenced ranges are also possible (e.g., at least 5 microns and less than or equal to 12 microns). Other values are also possible. Average diameter distributions for chopped strand glass fibers are generally log-normal. Chopped strand diameters tend to follow a normal distribution. Though, it can be appreciated that chopped strand glass fibers may be provided in any appropriate average diameter distribution (e.g., Gaussian distribution).

In some embodiments, the average length of the chopped strand glass fibers may be less than or equal to 25 mm, less than or equal to 10 mm, less than or equal to 8 mm, less than or equal to 6 mm, less than or equal to 5 mm, or less than or equal to 4 mm. In certain embodiments, the average length of the chopped strand glass fibers may be greater than or equal to greater than or equal to 3 mm, greater than or equal to 4 mm, greater than or equal to 5 mm, greater than or equal to 6 mm, greater than or equal to 8 mm, or greater than or equal to 10 mm. Combinations of the above referenced ranges are also possible (e.g., an average length of greater than or equal to 3 mm and less than or equal to 25 mm, greater than or equal to 3 mm and less or equal to than 10 mm). Other ranges are also possible.

It should be appreciated that the above-noted dimensions are not limiting and that the microglass and/or chopped strand fibers may also have other dimensions.

Chopped strand glass fibers may be included within a battery component (or a fiber layer of the battery component) in any suitable amounts with respect to the total weight of the glass fibers. In some embodiments, chopped strand glass fibers are present in an amount of 0%, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, or greater than or equal to 80 wt % with respect to the total weight of the glass fibers. In certain embodiments, the chopped strand glass fibers are present in an amount less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 10 wt % with respect to the total weight of the glass fibers. Combinations of the above referenced ranges are possible (e.g., greater than or equal to 30 wt % and less than or equal to 60 wt %). Other ranges are also possible.

As described herein, in some embodiments, the battery component may comprise a plurality of fibrillated fibers. As known to those of ordinary skill in the art, a fibrillated fiber includes a parent fiber that branches into smaller diameter fibrils, which can, in some instances, branch further out into even smaller diameter fibrils with further branching also being possible. The branched nature of the fibrils leads to a layer and/or fiber web having a high surface area and can increase the number of contact points between the fibrillated fibers and other fibers in the layer. Such an increase in points of contact between the fibrillated fibers and other fibers and/or components of the layer may contribute to enhancing mechanical properties (e.g., flexibility, strength.) of the battery component. Non-limiting examples of suitable materials for fibrillated fibers include cellulose-based fibers (e.g. cellulose wood such as cedar, cellulose non-wood), regenerated cellulose (e.g., synthetic cellulose such as lyocell, rayon), acrylics, liquid crystalline polymers, polyoxazoles (e.g., poly(p-phenylene-2,6-benzobisoxazole), aramids, p-aramids, polyethylenes, polyesters, polyamides, cotton, polyolefins, and olefins.

In some embodiments, the plurality of fibrillated fibers are present in the battery component (or in a fiber layer of the battery component) in an amount greater than or equal to 1 wt %, greater than or equal to 2.5 wt %, greater than or equal to 5 wt %, greater than or equal to 7.5 wt %, greater than or equal to 10 wt %, or greater than or equal to 12.5 wt % versus the total weight of th.e battery component (or a fiber layer of the battery component). In certain embodiments, the plurality of fibrillated fibers are present in the battery component in an amount of less than or equal to 15 wt %, less than or equal to 12.5 wt %, less than or equal to 10 wt %, less than or equal to 7.5 wt %, less than or equal to 5 wt %, or less than or equal to 2.5 wt % versus the total weight of the battery component (or a fiber layer of the battery component). Combinations of the above referenced ranges are possible (e.g., greater than or equal to 1 wt % and less than or equal to 15 wt %, greater than or equal to 1 wt % and less than or equal to 10 wt %, greater than or equal to 1 wt % and less than or equal to 7.5 wt %). Other ranges are also possible.

In certain embodiments, the plurality of fibrillated fibers may be characterized by a level of fibrillation as determined by the Canadian Standard Freeness (CSF) test, specified by TAPPI test method T 227 om 09 Freeness of pulp. The test can provide an average CSF value. In some embodiments, the level of fibrillation of the plurality of fibrillated fibers may be greater than or equal to 20 CSF, greater than or equal to 50 CSF, greater than or equal to 75 CSF, greater than or equal to 100 CSF, greater than or equal to 200 CSF, greater than or equal to 400 CSF, or greater than or equal to 600 CSF. In certain embodiments, the level of fibrillation of the plurality of fibrillated fibers may be less than or equal to 650 CSF, less than or equal to 600 CSF, less than or equal to 400 CSF, less than or equal to 200 CSF, less than or equal to 100 CSF, less than or equal to 75 CSF, or less than or equal to 50 CSF. Combinations of the above-referenced ranges are possible (e.g., greater than or equal to 20 CSF and less than or equal to 650 CSF, greater than or equal to 20 CSF and less than or equal to 100 CSF). Other ranges are also possible.

In certain embodiments, the parent fibers of the plurality of fibrillated fibers may have a particular average fiber diameter. For example, in certain embodiments, the parent fibers of the plurality of fibrillated fibers have an average fiber diameter of greater than or equal to 0.1 microns, greater than or equal to 0.5 microns, greater than or equal to 1 micron, greater than or equal to 2 microns, greater than or equal to 5 microns, greater than or equal to 10 microns, greater than or equal to 15 microns, greater than or equal to 20 microns, greater than or equal to 30 microns, or greater than or equal to 40 microns. In some embodiments, the plurality of fibrillated fibers have an average fiber diameter of less than or equal to 50 microns, less than or equal to 40 microns, less than or equal to 30 microns, less than or equal to 20 microns, less than or equal to 15 microns, less than or equal to 10 microns, less than or equal to 5 microns, less than or equal to 2 microns, less than or equal to 1 micron, or less than or equal to 0.5 microns. Combinations of the above referenced ranges are possible (e.g., greater than or equal to 1 microns and less than or equal to 50 microns, greater than or equal to 0.1 microns and less than or equal to 30 microns). Other ranges are also possible.

The average fiber diameter of the fibrils of the fibrillated fibers is generally less than the average fiber diameter of the parent fibers. Depending on the average fiber diameter of the parent fibers, in some embodiments, the fibrils may have an average fiber diameter of less than or equal to 25 microns, less than or equal to 20 microns, less than or equal to 10 microns, less than or equal to 5 microns, less than or equal to 1 micron, less than or equal to 0.5 microns, less than or equal to 0.1 microns, less than or equal to 0.05 microns, or less than or equal to 0.01 microns. In some embodiments the fibrils may have an average fiber diameter of greater than or equal to 0.003 microns, greater than or equal to 0.01 micron, greater than or equal to 0.05 microns, greater than or equal to 0.1 microns, greater than or equal to 0.5 microns greater than or equal to 1 micron, greater than or equal to 5 microns, greater than or equal to 10 microns, or greater than or equal to 20 microns. Combinations of the above referenced ranges are also possible (e.g., fibrils having an average fiber diameter of greater than or equal to 0.01 microns and less than or equal to 20 microns). Other ranges are also possible.

In some embodiments, the plurality of fibrillated fibers may have a particular average length. In some embodiments, the average length of the plurality of fibrillated fibers is greater than or equal to greater than or equal to 0.1 mm, greater than or equal to 0.5 mm, greater than or equal to 1 mm, greater than or equal to 2 mm, greater than or equal to 5 mm, greater than or equal to 10 mm, greater than or equal to 15 mm, or greater than or equal to 20 mm. In certain embodiments, the average length of the plurality of fibrillated fibers is less than or equal to 25 mm, less than or equal to 20 mm, less than or equal to 15 mm, less than or equal to 10 mm, less than or equal to 5 mm, less than or equal to 2 mm, less than or equal to 1 mm, or less than or equal to 0.5 mm Combinations of the above-referenced ranges are possible (e.g., greater than or equal to 0.1 mm and less than or equal to 25 mm, greater than or equal to 1 mm and less than or equal to 15 mm). Other ranges are also possible.

In some embodiments, the battery component may comprise a plurality of synthetic fibers. Synthetic fibers may be monocomponent fibers (e.g., polyethylene fibers, copolyester fibers) or multicomponent fibers (e.g., bicomponent fibers). In some embodiments, the battery component includes bicomponent fibers. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. The core/sheath binder fibers can be concentric or non-concentric. Other exemplary bicomponent fibers can include split fiber fibers, side-by-side fibers, and/or "island in the sea" fibers.

The synthetic fibers may comprise any suitable synthetic material. Non-limiting examples of suitable materials for the plurality of synthetic fibers (e.g., the monocomponent fibers, the bicomponent fibers) include polyethylene terephthalate (PET), polyethylene (PE), PET/PE (core/sheath), PET/co-PET, polyalkylenes (e.g., polyethylene, polypropylene, polybutylene), polyesters (e.g., polyethylene terephthalate), polyamides (e.g., nylons, aramids), halogenated polymers (e.g., polytetranuoroethylenes), and combinations thereof.

In some embodiments, the plurality of synthetic fibers (e.g., monocomponent fibers, bicomponent fibers) may be present in the battery component (or in a fiber layer of the battery component) in an amount greater than or equal to 0 wt %, greater than or equal to 1 wt %, greater than or equal to 2 wt %, greater than or equal to 3 wt %, greater than or equal to 4 wt %, greater than or equal to 5 wt %, greater than or equal to 6 wt %, greater than or equal to 7 wt %, greater than or equal to 8 wt %, or greater than or equal to 9 wt % versus the total weight of the battery component (or a fiber layer of the battery component). In certain embodiments, the plurality of synthetic fibers are present in the battery component in an amount less than or equal to 10 wt %, less than or equal to 9 wt %, less than or equal to 8 wt %, less than or equal to 7 wt %, less than or equal to 6 wt %, less than or equal to 5 wt %, less than or equal to 4 wt %, less than or equal to 3 wt %, less than or equal to 2 wt %, or less than or equal to 1 wt % versus the total weight of the battery component (or a fiber layer of the battery component). Combinations of the above referenced ranges are also possible (e.g., greater than or equal to 0 wt % and less than or equal to 10 wt %, greater than or equal to 1 wt % and less than or equal to 8 wt %, greater than or equal to 1 wt % and less than or equal to 4 wt %). Other ranges are also possible. In some embodiments, the battery component does not comprise synthetic fibers.

In certain embodiments, the plurality of synthetic fibers (e.g., monocomponent fibers, bicomponent fibers) may have a particular average fiber diameter. For example, in certain embodiments, the plurality of synthetic fibers may have an average fiber diameter of greater than or equal to 0.1 microns, greater than or equal to 0.5 microns, greater than or equal to 1 micron, greater than or equal to 2 microns, greater than or equal to 5 microns, greater than or equal to 10 microns, greater than or equal to 15 microns, greater than or equal to 20 microns, greater than or equal to 25 microns, greater than or equal to 30 microns, or greater than or equal to 40 microns. In some embodiments, the plurality of synthetic fibers have an average fiber diameter of less than or equal to 50 microns, less than or equal to 40 microns, less than or equal to 30 microns, less than or equal to 25 microns, less than or equal to 20 microns, less than or equal to 15 microns, less than or equal to 10 microns, less than or equal to 5 microns, less than or equal to 2 microns, less than or equal to 1 micron, or less than or equal to 0.5 microns. Combinations of the above referenced ranges are possible (e.g., greater than or equal to 0.1 microns and less than or equal to 50 microns, greater than or equal to 1 microns and less than or equal to 25 microns). Other ranges are also possible.

In some embodiments, the plurality of synthetic fibers (e.g., monocomponent fibers, bicomponent fibers) may have a particular average length. In some embodiments, the average length of the plurality of synthetic fibers is greater than or equal to 0.1 mm, greater than or equal to 0.5 mm, greater than or equal to 1 mm, greater than or equal to 2 mm, greater than or equal to 5 mm, greater than or equal to 10 mm, greater than or equal to 15 mm, or greater than or equal to 20 mm In certain embodiments, the average length of the plurality of synthetic fibers is less than or equal to 25 mm, less than or equal to 20 mm, less than or equal to 15 mm, less than or equal to 10 mm, less than or equal to 5 mm, less than or equal to 2 mm, less than or equal to 1 mm, or less than or equal to 0.5 mm. Combinations of the above-referenced ranges are possible (e.g., greater than or equal to 0.1 mm and less than or equal to 25 mm, greater than or equal to 2 mm and less than or equal to 15 mm). Other ranges are also possible.

In some embodiments, the battery component (or a fiber layer of the battery component) may comprise a resin. Advantageously, the incorporation of a resin into a fiber layer as described herein may protect the fibers, e.g., from acid degradation, and/or may increase the mechanical strength (e.g., tensile strength) of the battery component (or a fiber layer of the battery component), without substantially blocking the pores of the fiber layer. In certain embodiments, the resin coats at least a portion of one or more pluralities of fibers (e.g., plurality of fine glass fibers, plurality of coarse glass fibers, plurality of fibrillated fibers) in the fiber layer. However, in some embodiments, not all fibers are coated. The extent of the coating may vary. In some cases, the coating covers the entire fiber; though, in other cases, only a portion of the fibers is coated. In some embodiments, the resin is mixed with the fiber layer before adhering the fiber layer to a battery grid and/or before adding a paste to the battery component.

The resin may comprise any suitable material including, but not limited to, acrylic binder, natural rubber, acrylic, latex emulsion, styrene-acrylic, synthetic rubber (e.g., styrene-butadiene rubber), styrene acrylonitrile, and combinations thereof.

In some embodiments, the resin is free of a crosslinker.

In some embodiments, the resin is hydrophobic. The term hydrophobic, as used herein, generally refers to a material having a contact angle with water (e.g., deionized water) of greater than 90 degrees. The contact angle of a resin may be determined by depositing a thin layer of the resin on a smooth planar substrate and curing the resin. The water contact angle may be then measured according to the standard ASTM D5946-04. The contact angle is the angle between the substrate surface and the tangent line drawn to the water droplet surface at the three-phasepoint, when a liquid drop of water is resting on a plane solid surface, measured using a contact angle goniometer. In some embodiments, the contact angle of the resin may be greater than 90 degrees, may be greater than or equal to 100 degrees, greater than or equal to 110 degrees, greater than or equal to 120 degrees, greater than or equal to 130 degrees, greater than or equal to 140 degrees, greater than or equal to 150 degrees, greater than or equal to 160 degrees, or greater than or equal to 170 degrees. In certain embodiments, the contact angle of the resin may be less than or equal to 180 degrees, less than or equal to 170 degrees, less than or equal to 160 degrees, less than or equal to 150 degrees, less than or equal to 140 degrees, less than or equal to 130 degrees, less than or equal to 120 degrees, less than or equal to 110 degrees, or less than or equal to 100 degrees. Combinations of the above-referenced ranges are possible (e.g., greater than or equal to 110 degrees and less than or equal to 180 degrees). Other ranges are also possible.

In certain embodiments, the resin may be present in the battery component (or in a fiber layer of the battery component) in an amount of greater than or equal to 1 wt %, greater than or equal to 2 wt %, greater than or equal to 5 wt %, greater than or equal to 7 wt %, greater than or equal to 10 wt %, or greater than or equal to 12 wt % versus the total weight of the battery component (or the fiber layer of the battery component). In some embodiments, the resin may be present in the battery component (or a fiber layer of the battery component) in an amount of less than or equal to 15 wt %, less than or equal to 12 wt %, less than or equal to 10 wt %, less than or equal to 7 wt %, less than or equal to 5 wt %, or less than or equal to 2 wt % versus the total weight of the battery component (or the fiber layer of the battery component). Combinations of the above referenced ranges are possible (e.g., greater than or equal to 1 wt % and less than or equal to 15 wt %, greater than or equal to 1 wt % and less than or equal to 10 wt %, greater than or equalto 1 wt % and less than or equal to 5 wt %). Other ranges are also possible.

In some cases, the fiber layer or battery component with resin may be characterized by a Cobb parameter. The Cobb parameter is generally a measure of the water absorptiveness. Briefly, the Cobb parameter is the mass of water (e.g., in grams) absorbed over 120 seconds per 1 square meter of the fiber layer or battery component with resin. The Cobb parameter of the fiber layer or battery component with resin may be determined by the TAPPI T411 om-09 standard test. In some embodiments, the Cobb parameter of the fiber layer or battery component with resin is greater than or equal to 50 g of water per $m^2$ of sample (gsm), greater than or equal to 55 gsm, greater than or equal to 60 gsm, greater than or equal to 65 gsm, greater than or equal to 70 gsm, or greater than or equal to 75 gsm. In certain embodiments, the Cobb parameter of the fiber layer or battery component with resin is less than or equal to 80 gsm, less than or equal to 75 gsm, less than or equal to 70 gsm, less than or equal to 65 gsm, less than or equal to 60 gsm, or less than or equal to 55 gsm. Combinations of the above referenced ranges are possible (e.g., greater than or equal to 50 gsm and less than or equal to 80 gsm, greater than or equal to 50 gsm and less than or equal to 70 gsm). Other ranges are also possible.

In some embodiments a battery component (or a layer of the battery component), such as a pasting paper, does not include activated carbon or conductive carbon. Such a battery component or layer may have a particular desirable internal resistance, as determined by BCIS-03B, Rev. December 02 using a sulfuric acid bath having a specific gravity of 1.280±0.005 at 80° F. In some embodiments, the internal resistance of the battery component (that does not include conductive carbon and activated carbon) is greater than or equal to 0 ohm·$cm^2$, greater than or equal to 0.5 ohm·$cm^2$, greater than equal to 1 ohm·$cm^2$, greater than or equal to 2 ohm·$cm^2$, greater than or equal to 3 ohm·$cm^2$, or greater than or equal to 4 ohm·$cm^2$. In certain embodiments, the internal resistance of the battery component (that does not include conductive carbon and activated carbon) is less than or equal to 5 ohm·$cm^2$, less than or equal to 4 ohm·$cm^2$, less than or equal to 3 ohm·$cm^2$, less than or equal to 2 ohm·$cm^2$, less than or equal to 1 ohm·$cm^2$, less than or equal to 0.5 ohm·$cm^2$, less than or equal to 0.3 ohm·$cm^2$, or less than or equal to 0.2 ohm·$cm^2$. Combinations of the above-referenced ranges are also possible (e.g., greater than or equal to 0 ohm·$cm^2$ and less than or equal to 1 ohm·$cm^2$, greater than or equal to 0 ohm·$cm^2$ and less than or equal to 0.5 ohm·$cm^2$). Other ranges are also possible.

In some embodiments, one or more additives may be present in the battery component (or a layer of the battery component). In some embodiments, the additive comprises lead (e.g., lead oxide, red lead, lead), flock fibers, carbon, lignin, sodium sulfate, lead sulfate, sulfuric acid, water, or combinations thereof. In one set of embodiments, the additive comprises carbon (e.g., activated carbon, conductive carbon). In some embodiments, the additives are added to a paste to form portions of the battery component. In some embodiments, an additive may include a hydrogen suppressant as described in more detail herein. In certain embodiments, an additive may comprise a binder.

As described herein, in some embodiments, the battery component may comprise one or more additives such as activated carbon and/or conductive carbon which can result in an increase in the conductivity of the battery component.

In some embodiments the additive comprises activated carbon and/or conductive carbon. Non-limiting examples of suitable types of conductive carbon additives include carbon black, acetylene black, graphite, carbon PAN, conductive carbon fibers, and carbon nanotubes. Non-limiting examples of suitable types of activated carbon includes carbon based derivatives from petroleum products such a petroleum pitch, coconut shell, starches, wood-based products, and including, for example, carbon based derivatives obtained through steam, $CO_2$, and/or chemical activation (e.g., using KOH, NaOH, or the like).

In some embodiments, the one or more additives (e.g., activated carbon and/or conductive carbon) may be added to a battery component as a layer (e.g., optional layer 7 in FIG. 1). For instance, an additive layer (e.g., conductive layer) may be formed on a surface of a fiber layer of the battery component. In such embodiments, the additive layer (e.g., conductive layer) may be directly adjacent the fiber layer. In other embodiments, one or more additives may be incorporated into a fiber layer of the battery component (e.g., mixed into or dispersed within the fiber layer). In yet other embodiments, one or more additives may be incorporated into a fiber layer of the battery component (e.g., mixed into or dispersed within the fiber layer) and may form an additive layer (e.g., conductive layer) on a surface of the fiber. In some embodiments, the activated carbon and/or conductive carbon may be added to the battery component (or a fiber layer of a battery component) via a coating process, a lamination process, or by beater addition. Other processes are also possible.

In some embodiments, the total amount of carbon (e.g., comprising conductive and/or activated carbon) present within the battery component is greater than or equal to 50 wt %, greater than or equal to 60 wt %, greater than or equal to 70 wt %, greater than or equal to 80 wt %, or greater than or equal to 90 wt % versus the total weight of the battery component. In certain embodiments, the total amount of carbon present within the battery component is less than or equal to 95 wt %, less than or equal to 90 wt %, less than or equal to 80 wt %, less than or equal to 70 wt %, or less than or equal to 60 wt % versus the total weight of the battery component. Combinations of the above referenced ranges are also possible (e.g., greater than or equal to 50 wt % and less than or equal to 95 wt %, greater than or equal to 70 wt % and less than or equal to 95 wt %, greater than or equal to 80 wt % and less than or equal to 90 wt %). Other ranges are also possible.

In some embodiments, the fibers or one or more fiber layers of the battery component is present in the battery component in the remaining weight amount not occupied by the additives (e.g., carbon, such as conductive carbon and/or activated carbon). As an illustrative example, in some embodiments, the total weight of the carbon (e.g, comprising activated carbon and conductive carbon) present in the battery component is greater than 50 wt % and less than or equal to 95 wt %, and the total weight of the fibers or fiber layer (e.g., comprising a plurality of glass fibers, and a plurality of fibrillated fibers) present in the battery component is greater than 5 wt % and less than or equal to 50 wt %. In some such embodiments, a plurality of tine glass fibers may be present in the fiber layer in an amount of greater than or equal to 30 wt % and less than or equal to 60 wt % versus the total weight of the fiber layer, a plurality of course glass fibers may be present in the fiber layer in an amount of greater than or equal to 30 wt % and less than or equal to 60 wt % versus the total weight of the fiber layer, and a plurality of fibrillated fibers may be present in the fiber layer in an amount greater than or equal to 1 wt % and less than or equal to 15 wt % versus the total weight of the fiber layer. As described herein, the fiber layer may also comprise one or more of synthetic fibers and/or a resin.

In some embodiments, conductive carbon is present within the battery component (or layer) in amount of greater than or equal to 0.1 wt %, greater than or equal to 0.5 wt %, greater than or equal to 1 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt % versus the total weight of the battery component. In certain embodiments, the conductive carbon is present within the battery component in an amount of less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 5 wt %, less than or equal to 1 wt %, or less than or equal to 0.5 wt %. Combinations of the above referenced ranges are also possible (e.g., greater than or equal to 0.1 wt % and less than or equal to 50 wt %, greater than or equal to 1 wt % and less than or equal to 30 wt %, greater than or equal to 1 wt % and less than or equal to 10 wt %). Other ranges are also possible.

In certain embodiments, activated carbon is present within the battery component (or layer) in an amount greater than or equal to 0.1 wt %, greater than or equal to 0.5 wt %, greater than or equal to 1 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 85 wt %, or greater than or equal to 90 wt % versus the total weight of the battery component. In certain embodiments, the activated carbon is present within the battery component in an amount less than or equal to 95 wt %, less than or equal to 90 wt %, less than or equal to 85 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 15 wt %, less than or equal to 10 wt %, less than or equal to 5 wt %, less than or equal to 1 wt %, or less than or equal to 0.5 wt % versus the total weight of the battery component. Combinations of the above referenced ranges are also possible (e.g., greater than or equal to 0.1 wt % and less than or equal to 95 wt %, greater than or equal to 50 wt % and less than or equal to 95 wt %, greater than or equal to 70 wt % and less than or equal to 90 wt %). Other ranges are also possible.

In some embodiments, both activated carbon and conductive carbon may be present within the battery component. The components may be present in a particular ratio. Advantageously, an electrochemical cell comprising a battery component having a particular ratio of activated carbon to conductive carbon may have improved battery life and performance. In some embodiments, the ratio of activated carbon to conductive carbon is greater than or equal to 70:30, greater than or equal to 75:25, greater than or equal to 80:20, greater than or equal to 85:15, greater than or equal to 90:10, greater than or equal to 92:8, greater than or equal to 94:6, greater than or equal to 95:5, greater than or equal to 96:4, greater than or equal to 97:3, or greater than or equal to 98:2. In certain embodiments, the ratio of activated carbon to conductive carbon is less than or equal to 99:1, less than or equal to 98:2, less than or equal to 97:3, less than or equal to 96:4, less than or equal to 95:5, less than or equal to 94:6, less than or equal to 92:8, less than or equal to 90:10, less than or equal to 85:15, less than or equal to 80:20, or less than or equal to 75:25. Combinations of the above referenced ranges are also possible (e.g., greater than or equal to 70:30 and less than or equal to 99:1, greater than or equal to 90:10 and less than or equal to 99:1, greater than or equal to 90:10 and less than or equal to 96:4). Other ranges are also possible.

In some embodiments, the conductive carbon may have a particular specific surface area. In some embodiments, the specific surface area of the conductive carbon is greater than or equal to 1 $m^2/g$, greater than or equal to 5 $m^2/g$, greater than or equal to 10 $m^2/g$, greater than or equal to 15 $m^2/g$, greater than or equal to 20 $m^2/g$, greater than or equal to 30 $m^2/g$, greater than or equal to 40 $m^2/g$, greater than or equal to 50 $m^2/g$, greater than or equal to 60 $m^2/g$, greater than or equal to 65 m²/g, greater than or equal to 70 m²/g, greater than or equal to 75 m²/g, greater than or equal to 80 m²/g, greater than or equal to 85 m²/g, greater than or equal to 90 m²/g, or greater than or equal to 100 m²/g. In certain embodiments, the specific surface area of the conductive carbon is less than or equal to 100 m²/g, less than or equal to 90 m²/g, less than or equal to 85 m²/g, less than or equal to 80 m²/g, less than or equal to 75 m²/g, less than or equal to 70 m²/g, less than or equal to 65 m²/g, less than or equal to 60 m²/g, less than or equal to 50 m²/g, less than or equal to 40 m²/g, less than or equal to 30 m²/g, less than or equal to 20 m²/g, less than or equal to 15 m²/g, less than or equal to 10 m²/g, or less than or equal to 5 m²/g. Combinations of the above reference ranges are also possible (e.g., greater than or equal to 1 m²/g and less than or equal to 100 m²/g, greater than or equal to 40 m²/g and less than or equal to 60 m²/g). Other ranges are also possible.

In certain embodiments, the activated carbon may have a particular specific surface area. In certain embodiments, the specific surface area of the activated carbon is greater than or equal to 100 m²/g, greater than or equal to 250 m²/g, greater than or equal to 500 m²/g, greater than or equal to 750 m²/g, greater than or equal to 1000 m²/g, greater than or equal to 1500 m²/g, greater than or equal to 2000 m²/g, greater than or equal to 2500 m²/g, or greater than or equal to 3000 m²/g. In some embodiments, the specific surface area of the activated carbon is less than or equal to 3500 m²/g, less than or equal to 3000 m²/g, less than or equal to 2500 m²/g, less than or equal to 2000 m²/g, less than or equal to 1500 m²/g, less than or equal to 1000 m²/g, less than or equal to 750 m²/g, less than or equal to 500 m²/g. or less than or equal to 250 m²/g. Combinations of the above-referenced ranges are also possible (e.g., greater than or equal to 100 m²/g and less than or equal to 3500 m²/g, greater than or equal to 1000 m²/g and less than or equal to 2500 m²/g,). Other ranges are also possible.

In some embodiments, the total carbon present in the battery component is greater than or equal to 80 wt % and less than or equal to 90 wt % and the ratio of activated carbon to conductive carbon is greater than or equal to 90:10 and less than or equal to 99:1 (e.g., greater than or equal to 90:10 and less than or equal to 96:4).

A battery component comprising one or more additives including conductive carbon and activated carbon may have a particular internal resistance. The internal resistance of the battery component including conductive carbon and activated carbon may be measured using the IEC 62576 standard (2009) constant current method by using a symmetric super capacitor having two identical battery components in a symmetric super capacitor assembly. In this method, an Equivalent Series Resistance (ESR) value (in ohm), when charging/discharging the supercapacitor with the constant current, can be calculated from the value of voltage jump/drop, when the current direction changes from discharge to charge or charge to discharge using the equation:

$$ESR = U_{jump/drop}/I$$

where, I is the constant current of charging/discharging and $U_{jump/drop}$ is the change in potential when the direction changes from charge to discharge or from discharge to charge.

In some embodiments, the internal resistance of the battery component including conductive carbon and activated carbon is greater than or equal to 0 ohm·cm², greater than or equal to 0.5 ohm·cm², greater than or equal to 1 ohm·cm², greater than or equal to 2 ohm·cm², greater than or equal to 3 ohm·cm², greater than or equal to 4 ohm·cm², greater than or equal to 5 ohm·cm², greater than equal to 6 ohm·cm², greater than or equal to 7 ohm·cm², greater than or equal to 8 ohm·cm², or greater than or equal to 9 ohm·cm². In certain embodiments, the internal resistance of the battery component including conductive carbon and activated carbon is less than or equal to 10 ohm·cm², less than or equal to 9 ohm·cm², less than or equal to 8 ohm·cm², less than or equal to 7 ohm·cm², less than or equal to 6 ohm·cm², less than or equal to 5 ohm·cm², less than or equal to 4 ohm·cm², less than or equal to 3 ohm·cm², less than or equal to 2 ohm·cm², less than or equal to 1 ohm·cm², or less than or equal to 0.5 ohm·cm². Combinations of the above-referenced ranges are also possible (e.g., greater than or equal to 0 ohm·cm² and less than or equal to 10 ohm·cm², greater than or equal to 0 ohm·cm² and less than or equal to 2 ohm·cm²). Other ranges are also possible.

In some embodiments, a battery component comprising one or more additives may include a hydrogen suppressant. Non-limiting examples of hydrogen suppressants include oxides, hydroxides, sulfates (e.g., sulfates of lead, zinc, cadmium, bismuth, and/or silver), tin, titanium, cobalt, antimony, and combinations thereof. The hydrogen suppressants may be present in the battery component in any suitable amount. In some embodiments, the hydrogen suppressant is present in the battery component (or layer) in an amount of greater than or equal to 0.1 wt %, greater than or equal to 0.2 wt %, greater than or equal to 0.3 wt %, greater than or equal to 0.4 wt %, greater than or equal to 0.5 wt %, greater than or equal to 0.6 wt %, greater than or equal to 0.8 wt %, greater than or equal to 1 wt %, greater than or equal to 1.2 wt %, greater than or equal to 1.5 wt %, or greater than or equal to 1.7 wt %. In certain embodiments, the hydrogen suppressant is present in the battery component (or layer) in an amount less than or equal to 2 wt %, less than or equal to 1.7 wt %, less than or equal to 1.5 wt %, less than or equal to 1.2 wt %, less than or equal to 1 wt %, less than or equal to 0.8 wt %, less than or equal to 0.6 wt %, less than or equal to 0.5 wt %, less than or equal to 0.4 wt %, less than or equal to 0.3 wt %, or less than or equal to 0.2 wt %. Combinations of the above-referenced ranges are possible (e.g., greater than or equal to 0.1 wt % and less than or equal to 2 wt %, greater than or equal to 0.5 wt % and less than or equal to 2 wt %). Other ranges are also possible. In some embodiments, the hydrogen suppressant is present in a battery component that includes conductive carbon and/or activated carbon, such as in the amounts described herein.

In certain embodiments, a battery component comprising one or more additives including conductive carbon and activated carbon may include one or more binders (e.g., to bind the conductive carbon and/or activated carbon together). Non-limiting examples of suitable binder materials include polytetrafluoroethylene (PTFE), carboxymethylcellulose (CMC), styrene-butadiene (SBR), acrylic, polyvinylidene fluoride (PVDF), or the like. The binder may be useful for, for example, binding the conductive carbon and/or the activated carbon to at least a portion of the plurality of fibers in the fiber layer. The binder may comprise particles and/or may be in liquid form when applied to the battery component.

In some embodiments, the binder is present within the battery component (or layer) in amount of greater than or equal to 1 wt %, greater than or equal to 5 wt %, greater than or equal to 10 wt %, greater than or equal to 20 wt %, greater than or equal to 30 wt %, or greater than or equal to 40 wt % versus the total weight of the battery component. In certain embodiments, the binder is present within the battery component (or layer) in an amount of less than or equal to 50 wt %, less than or equal to 40 wt %, less than or equal to 30 wt %, less than or equal to 20 wt %, less than or equal to 10 wt %, less than or equal to 5 wt %, or less than or equal to 2 wt %. Combinations of the above referenced ranges are also possible (e.g., greater than or equal to 1 wt % and less than or equal to 50 wt %, greater than or equal to 1 wt % and less than or equal to 30 wt %, greater than or equal to 1 wt % and less than or equal to 20 wt %). Other ranges are also possible.

In an exemplary embodiment, the battery component comprises a plurality of fine glass fibers having an average fiber diameter of less than 2 microns, a plurality of coarse glass fibers having an average fiber diameter of greater than or equal to 2 microns, and a plurality of fibrillated fibers. In some embodiments, the plurality of fine glass fibers are present in an amount greater than or equal to 30 wt % and less than or equal to 60 wt % versus the total weight of the battery component. In certain embodiments, the plurality of coarse glass fibers are present in an amount greater than or equal to 30 wt % and less than or equal to 60 wt % versus the total weight of the battery component. In some cases, the plurality of fibrillated fibers may be present in an amount greater than or equal to 1 wt % and less than or equal to 15 wt % versus the total weight of the battery component.

In some embodiments described above and/or herein, the battery component comprises a resin present in an amount greater than or equal to 1 wt % and less than or equal to 10 wt % versus the total weight of the battery component. The resin may be a hydrophobic resin. In certain embodiments, the battery component comprises a plurality of bicomponent fibers present in an amount of greater than 0 wt % (e.g., at least 1 wt %) and less than or equal to 8 wt % versus the total weight of the battery component. In some embodiments, the battery component has a specific surface area of greater than or equal to 0.2 m$^2$/g and less than or equal to 5 m$^2$/g. The battery component may have a mean pore size of greater than or equal to 0.1 microns and less than or equal to 15 microns. In some embodiments, the battery component has a dry tensile strength of greater than or equal to 0.1 pounds per inch and less than or equal to 15 pounds per inch. In some embodiments, the battery component has an air permeability of greater than or equal to 0.1 CFM and less than or equal to 1000 CFM.

In another exemplary embodiment, the battery component comprises a fiber layer, activated carbon and conductive carbon. The fiber layer comprises a plurality of fine glass fibers having an average fiber diameter of less than 2 microns, wherein the plurality of fine glass fibers are present in an amount greater than or equal to 30 wt % and less than or equal to 60 wt % versus the total weight of the fiber layer. The fiber layer also comprises a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the fiber layer. The fiber layer also comprises a plurality of fibrillated fibers present in an amount greater than or equal to 1 wt % and less than or equal to 15 wt % versus the total weight of the fiber layer. In some embodiments, the ratio of activated carbon to conductive carbon is greater than or equal to 90:10 and less than or equal to 99:1. In some embodiments, the activated carbon and/or conductive carbon is present within the fiber layer. Additionally or alternatively, the battery component comprises a second layer adjacent the fiber layer comprising the activated carbon and the conductive carbon.

In some embodiments described above and/or herein, the fiber layer comprises a resin present in an amount greater than or equal to 1 wt % and less than or equal to 10 wt % versus the total weight of the fiber layer. In certain embodiments, the resin is hydrophobic. In certain embodiments, the fiber layer comprises a plurality of bicomponent fibers present in an amount of greater than 0 wt % and less than or equal to 8 wt % versus the total weight of the fiber layer. In some embodiments, the battery component has a specific surface area of greater than or equal to 0.2 m$^2$/g and less than or equal to 5 m$^2$/g, in some cases, the battery component may have a mean pore size of greater than or equal to 0.1 microns and less than or equal to 15 microns. The battery component may have a dry tensile strength of greater than or equal to 0.1 pounds per inch and less than or equal to 15 pounds per inch. In some embodiments, the battery component has an air permeability of greater than or equal to 0.1 CFM and less than or equal to 1000 CFM.

In some cases, the battery component described herein (e.g., a battery component including a plurality of glass fibers and a plurality of fibrillated fibers described herein) may be relatively easy to process and/or may have desirable mechanical strength characteristics. The ease of processing and/or mechanical strength characteristics may be influenced by, at least in part, the dry tensile strength of the battery component (e.g., provided at least in part by the plurality of fibrillated fibers). In some embodiments, the dry tensile strength of the battery component is greater than or equal to 0.1 lbs. per inch, greater than or equal to 0.2 lbs. per inch, greater than or equal to 0.5 lbs. per inch, greater than or equal to 1 lb. per inch, greater than or equal to 2 lbs. per inch, greater than or equal to 5 lbs. per inch, greater than or equal to 7 lbs. per inch, greater than or equal to 10 lbs. per inch, or greater than or equal to 12 lbs. per inch. In certain embodiments, the dry tensile strength of the battery component is less than or equal to 15 lbs. per inch, less than or equal to 12 lbs. per inch, less than or equal to 10 lbs. per inch, less than or equal to 7 lbs. per inch. less than or equal to 5 lbs. per inch, less than or equal to 2 lbs. per inch, less than or equal to 1 lb. per inch, less than or equal to 0.5 lbs. per inch, or less than or equal to 0.2 lbs. per inch. Combinations of the above referenced ranges are possible (e.g., greater than or equal to 0.1 lbs. per inch and less than or equal to 15 lbs. per inch, greater than or equal to 0.5 lbs. per inch and less than or equal to 7 lbs. per inch). Other ranges are also possible. Dry tensile strength is measured in the machine direction and is determined according to BCIS 03A, Rev. December 2015, Method 9.

In certain embodiments, a battery component including a fiber layer described herein may exhibit improved adhesion to an electrode or battery grid (e.g., within a pasting paper application). Improved adhesion may be influenced by, at least in part, the mean pore size of the battery component.

Mean pore size, as used herein, is measured using the liquid porosimetry method (PMI capillary flow porometer) described in BCIS-03A, Rev. September 09, Method 6. In some embodiments, the mean pore size of the battery component is greater than or equal to 0.1 microns, greater than or equal to 0.2 microns, greater than or equal to 0.5 microns, greater than or equal to 1 micron, greater than or equal to 2 microns, greater than or equal to 5 microns, or greater than or equal to 10 microns. In certain embodiments, the mean pore size of the battery component is less than or equal to 15 microns, less than or equal to 10 microns, less than or equal to 5 microns, less than or equal to 2 microns, less than or equal to 1 micron, less than or equal to 0.5 microns, or less than or equal to 0.2 microns. Combinations of the above referenced ranges are possible (e.g., greater than or equal to 0.1 microns and less than or equal to 15 microns, greater than or equal to 0.5 microns and less than or equal to 10 microns). Other ranges are also possible.

As noted above, in some embodiments, a battery component described herein (e.g., a battery component including a plurality of glass fibers and a plurality of fibrillated fibers) may have a desirable resistance to acid stratification. The desirable resistance to acid stratification may be influenced by, at least in part, the specific surface area of the battery component. In certain embodiments, the specific surface area of the battery component is greater than or equal to 0.2 $m^2/g$, greater than or equal to 0.5 $m^2/g$, greater than or equal to 1 $m^2/g$, greater than or equal to 1.5 $m^2/g$, greater than or equal to 2 $m^2/g$, greater than or equal to 3 $m^2/g$, or greater than or equal to 4 $m^2/g$. In some embodiments, the specific surface area of the battery component is less than or equal to 5 $m^2/g$, less than or equal to 4 $m^2/g$, less than or equal to 3 $m^2/g$, less than or equal to 2 $m^2/g$, less than or equal to 1.5 $m^2/g$, less than or equal to 1 $m^2/g$, or less than or equal to 0.5 $m^2/g$. Combinations of the above referenced ranges are possible (e.g., greater than or equal to 0.2 $m^2/g$ and less than or equal to 5 $m^2/g$, greater than or equal to 0.5 $m^2/g$ and less than or equal to 3 $m^2/g$). Other ranges are also possible. The specific surface area (BET surface area) is measured according to section 10 of Battery Council international Standard BCIS-03A, "Recommended Battery Materials Specifications Valve Regulated Recombinant Batteries", method 8-September 2009 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in a ¾ tube; and the sample is allowed to degas at 75 degrees C. for a minimum of 3 hours.

In some embodiments, the battery component may have a particular basis weight. For instance, in certain embodiments, the battery component may have a basis weight of less than or equal to 200 $g/m^2$, less than or equal to 175 $g/m^2$, less than or equal to 150 $g/m^2$, less than or equal to 125 $g/m^2$, less than or equal to 100 $g/m^2$, less than or equal to 75 $g/m^2$, less than or equal to 50 $g/m^2$, less than or equal to 25 $g/m^2$, or less than or equal to 15 $g/m^2$. In some embodiments, the battery component may have a basis weight of greater than or equal to 10 $g/m^2$, greater than or equal to 15 $g/m^2$, greater than or equal to 25 $g/m^2$, greater than or equal to 50 $g/m^2$, greater than or equal to 75 $g/m^2$, greater than or equal to 100 $g/m^2$, greater than or equal to 125 $g/m^2$, greater than or equal to 150 $g/m^2$, or greater than or equal to 175 $g/m^2$. Combinations of the above referenced ranges are possible (e.g., greater than or equal to 10 $g/m^2$ and less than or equal to 200 $g/m^2$, greater than or equal to 15 $g/m^2$ and less than or equal to 100 $g/m^2$). Other ranges are also possible. The basis weight may be determined according to standard BCIS-03A, September-09, Method 3.

In some embodiments, the battery component may be relatively thin. For example, in some embodiments, the battery component has a thickness of less than or equal to 0.6 mm, less than or equal to 0.5 mm, less than or equal to 0.4 mm, less than or equal to 0.3 mm, or less than or equal to 0.2 mm. In certain embodiments, the battery component has a thickness of greater than or equal to 0.1 mm, greater than or equal to 0.2 mm, greater than or equal to 0.3 mm, greater than or equal to 0.4 mm, or greater than or equal to 0.5 mm. Combinations of the above referenced ranges are also possible (e.g., greater than or equal to 0.1 mm and less than or equal to 0.6 mm, greater than or equal to 0.1 mm and less than or equal to 0.3 mm). Other ranges are also possible. The thickness may be determined according to standard BCIS-03A, September-09, Method 10.

In some cases, the battery component may have a particular mean pore size. In some embodiments, the mean pore size of the battery component may be greater than or equal to 0.1 microns, greater than or equal to 0.2 microns, greater than or equal to 0.5 microns, greater than or equal to 1 micron, greater than or equal to 2 microns, greater than or equal to 5 microns, greater than or equal to 8 microns, greater than or equal to 10 microns, or greater than or equal to 12 microns. In certain embodiments, the mean pore size of the battery component may be less than or equal to 15 microns, less than or equal to 12 microns, less than or equal to 10 microns, less than or equal to 8 microns, less than or equal to 5 microns, less than or equal to 2 microns, less than or equal to 1 micron, less than or equal to 0.5 microns, or less than or equal to 0.2 microns. Combinations of the above referenced ranges are also possible (e.g., greater than or equal to 0.1 microns and less than or equal to 15 microns, greater than or equal to 0.5 microns and less than or equal to 10 microns). The mean pore size may be measured using liquid porosimetry method (PMI capillary Flow porometer) described in BCIS-03A, Rev. September 09, Method 6.

In some cases, the battery component may have a particular maximum pore size. In some embodiments, the maximum pore size of the battery component may be greater than or equal to 5 microns, greater than or equal to 10 microns, greater than or equal to 15 microns, greater than or equal to 20 microns, greater than or equal to 30 microns, greater than or equal to 50 microns, greater than or equal to 70 microns, or greater than or equal to 90 microns. In certain embodiments, the maximum pore size of the battery component may be less than or equal to 100 microns, less than or equal to 90 microns, less than or equal to 70 microns, less than or equal to 50 microns, less than or equal to 30 microns, less than or equal to 20 microns, less than or equal to 15 microns, or less than or equal to 10 microns. Combinations of the above referenced ranges are also possible (e.g., greater than or equal to 5 microns and less than or equal to 100 microns, greater than or equal to 15 microns and less than or equal to 70 microns). The maximum pore size may be measured using liquid porosimetry method (PMI capillary Flow porometer) described in BCIS-03A, Rev. September 09, Method 6.

In certain embodiments, the battery component may be designed to have desirable air permeability. In some embodiments, the air permeability of the battery component may be greater than or equal to 0.1 CFM, greater than or equal to 0.5 CFM, greater than or equal to 1 CFM, greater than or equal to 2 CFM, greater than or equal to 5 CFM, greater than or equal to 10 CFM, greater than or equal to 25 CFM, greater than or equal to 50 CFM, greater than or equal to 75 CFM, greater than or equal to 100 CFM, greater than or equal to 250 CFM, greater than or equal to 500 CFM, or greater than or equal to 750 CFM. In certain embodiments, the air permeability of the battery component may be less than or equal to 1000 CFM, less than or equal to 750 CFM, less than or equal to 500 CFM, less than or equal to 250 CFM, less than or equal to 100 CFM, less than or equal to 75 CFM, less than or equal to 50 CFM, less than or equal to 25 CFM, less than or equal to 10 CFM, less than or equal to 5 CFM, less than or equal to 2 CFM, less than or equal to 1 CFM, or less than or equal to 0.5 CFM. Combinations of the above reference ranges are also possible (e.g., greater than or equal to 0.1 CFM and less than or equal to 1000 CFM, greater than or equal to 0.5 CFM and less than 100 CFM). Other ranges are also possible. Air permeability may be determined according to TAPPI Method T251.

As described herein, in some embodiments, a battery component described herein may be a capacitance layer (e.g., comprising conductive carbon) that can be used in an electrochemical cell. In some embodiments, the capacitance layer comprises a plurality of fibers (e.g., glass fibers, synthetic fibers, fibrillated fibers, cellulosic (or derivatives thereof) fibers, carbon fibers, and/or combinations thereof), activated carbon, conductive carbon, and a binder. Other components may also be present.

Figure 2:
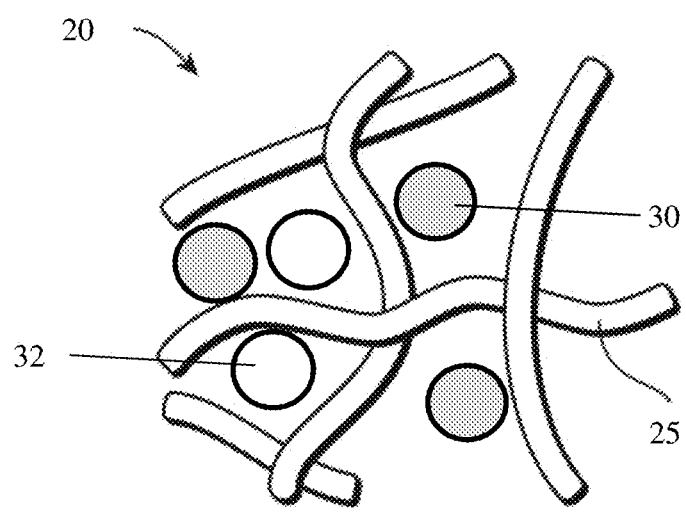
FIG. 2 is a schematic diagram showing a cross section of a fiber layer including a plurality of fibers and an additive according to one set of embodiments.

In some embodiments, the activated carbon and conductive carbon may be impregnated within the plurality of fibers (e.g., within a fiber layer). For example, as illustrated in FIG. 2, in some embodiments, a layer 20 comprises a plurality of fibers 25, and a conductive carbon 30 and an activated carbon 30 impregnated within plurality of fibers 25. The layer may be used as a conductive layer or capacitance layer.

In certain embodiments, the activated carbon and conductive carbon may be mixed with a binder to form a mixture (e.g., to form capacitor ink or dough). The mixture may then be incorporated into/onto a plurality of fibers (e.g., in a fiber layer) by saturating the plurality of fibers with the mixture and/or coating the mixture on top of a fiber layer comprising the plurality of fibers. For example, referring to FIG. 1, the battery component 5 (e.g., a capacitance layer) may comprise fiber layer 6 comprising a plurality of fibers and optional layer 7 which may be, in some such embodiments, a coating comprising the mixture of activated carbon and conductive carbon, binder, and optionally, a hydrogen suppressant and/or other additives or components. Methods for coating a layer are described in more detail herein.

In some embodiments, the capacitance layer can be positioned adjacent (e.g., directly adjacent) to, for example, either or both sides of a component of a battery such as a separator and/or an electrode, without carbon impregnation into the separator and/or electrode. In some embodiments, the separator and capacitance layer may be incorporated into the battery during battery assembly. In certain embodiments, the separator may be directly adjacent with a plate (e.g., a positive plate, a negative plate) such that the separator is present between the capacitance layer and the plate (i.e., the capacitance layer is not directly adjacent the plate).

In some embodiments, the capacitance layer comprises a total amount of fibers in an amount of greater than or equal to 0 wt % and less than or equal to 95 wt % versus the total weight of the capacitance layer. In some embodiments, the fibers include one or more of glass fibers, synthetic fibers, fibrillated fibers, cellulosic (or derivatives thereof) fibers, and carbon fibers. In some embodiments, the plurality of fibers is present in the capacitance layer in an amount of greater than or equal to 0 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, or greater than or equal to 90 wt % versus the total weight of the capacitance layer. In certain embodiments, the plurality of fibers is present in the capacitance layer in an amount of less than or equal to 95 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt %. Combinations of the above-referenced ranges are possible (e.g., greater than or equal to 0 wt % and less than or equal to 95 wt %, greater than or equal to 85 wt % and less than or equal to 95 wt %, greater than or equal to 90 wt % and less than or equal to 95 wt %, greater than or equal to 80 wt % and less than or equal to 95 wt %, greater than or equal to 5 wt % and less than or equal to 50 wt %, greater than or equal to 5 wt % and less than or equal to 20 wt %). Other ranges are also possible.

In an exemplary embodiments, the capacitance layer comprises a plurality of glass fibers. In some embodiments, the plurality of glass fibers is present in the capacitance layer in an amount of greater than or equal to 0 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, or greater than or equal to 90 wt % versus the total weight of the capacitance layer. In certain embodiments, the plurality of glass fibers is present in the capacitance layer in an amount of less than or equal to 95 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt %. Combinations of the above-referenced ranges are possible (e.g., greater than or equal to 0 wt % and less than or equal to 95 wt %, greater than or equal to 85 wt % and less than or equal to 95 wt %, greater than or equal to 90 wt % and less than or equal to 95 wt %, greater than or equal to 80 wt % and less than or equal to 95 wt %, greater than or equal to 5 wt % and less than or equal to 50 wt %, greater than or equal to 5 wt % and less than or equal to 20 wt %). Other ranges are also possible.

In some embodiments, the plurality of fibers are selected from the group consisting of glass fibers, synthetic fibers, fibrillated fibers, cellulosic (or derivatives thereof) fibers, carbon fibers, and combinations thereof. In a particular embodiment, the capacitance layer comprises a plurality of glass fibers. Advantageously, capacitance layers comprising a plurality of glass fibers may have desirable properties including, but not limited to, increased battery lifetime and/or ease of manufacturing (e.g., during incorporation of a capacitance layer as a separate layer adjacent an electrode) as compared to certain existing cells in which capacitance particles (e.g., comprising carbon) are mixed with electroactive materials.

For example, in some embodiments, the plurality of fibers comprises a plurality of fine glass fibers and a plurality of coarse glass fibers. in some embodiments, the ratio of fine glass fibers to coarse glass fibers in the capacitance layer may be greater than or equal to 10:90, greater than or equal to 15:85, greater than or equal to 20:80, greater than or equal to 25:75, greater than or equal to 30:70, greater than or equal to 35:65, greater than or equal to 40:60, greater than or equal to 45:55, greater than or equal to 50:50, greater than or equal to 55:45, greater than or equal to 60:40, greater than or equal to 65:35, greater than or equal to 70:30, greater than or equal to 75:25, greater than or equal to 80:20, or greater than or equal to 85:15. In certain embodiments, the ratio of fine glass fibers to coarse glass fibers in the capacitance layer may be less than or equal to 90:10, less than or equal to 85:15, less than or equal to 80:20, less than or equal to 75:25, less than or equal to 70:30, less than or equal to 65:35, less than or equal to 60:40, less than or equal to 55:45, less than or equal to 50:50, less than or equal to 45:55, less than or equal to 40:60, less than or equal to 35:65, less than or equal to 30:70, less than or equal to 25:75, less than or equal to 20:80, or less than or equal to 15:85. Combinations of the above referenced ranges are possible (e.g., greater than or equal to 10:90 and less than or equal to 90:10). Other ranges are also possible. In some embodiments, the fine glass fibers are microglass fibers and the coarse glass fibers are chopped strand fibers.

In some embodiments, capacitance layers having a particular ratio of activated carbon to conductive carbon may have desirable properties including, but not limited to, improved battery performance (e.g., including substantially instantaneous production of current upon initial discharge of the battery) and improved battery life. In some embodiments, the ratio of activated carbon to conductive carbon in the capacitance layer is greater than or equal to 70:30, greater than or equal to 72:28, greater than or equal to 75:25, greater than or equal to 77:23, greater than or equal to 80:20, greater than or equal to 82:18, greater than or equal to 85:15, greater than or equal to 87:13, greater than or equal to 90:10, greater than or equal to 90.5:9.5, greater than or equal to 91:9, greater than or equal to 91.5:8.5, greater than or equal to 92:8, greater than or equal to 92.5:7.5, greater than or equal to 93:7, greater than or equal to 93.5:6.5, greater than or equal to 94:6, greater than or equal to 94.5:5.5, greater than or equal to 95:5, greater than or equal to 95.5:4.5, greater than or equal to 96:4, greater than or equal to 96.5:3.5, greater than or equal to 97:3, greater than or equal to 97.5:2.5, greater than or equal to 98:2, greater than or equal to 98.5:1.5, or greater than or equal to 99:1. In certain embodiments, the ratio of activated carbon to conductive carbon in the capacitance layer is less than or equal to 99.5:0.5, less than or equal to 99:1, less than or equal to 98.5:1.5, less than or equal to 98:2, less than or equal to 97.5:2.5, less than or equal to 97:3, less than or equal to 96.5:3.5, less than or equal to 96:4, less than or equal to 95.5:4.5, less than or equal to 95:5, less than or equal to 94.5:5.5, less than or equal to 94:6, less than or equal to 93.5:6.5, less than or equal to 93:7, less than or equal to 92.5:7.5, less than or equal to 92:8, less than or equal to 91.5:8.5, less than or equal to 91:9, less than or equal to 90.5:9.5, less than or equal to 90:10, less than or equal to 87:13, less than or equal to 85:15, less than or equal to 82:18, less than or equal to 80:20, less than or equal to 77:23, less than or equal to 75:25, or less than or equal to 72:28. Combinations of the above referenced ranges are also possible (e.g., greater than or equal to 70:30 and less than or equal to 99:1, greater than or equal to 90:10 and less than or equal to 99:1, greater than or equal to 90:10 and less than or equal to 96:4). Other ranges are also possible.

In some embodiments, the total amount of carbon (e.g., comprising conductive and/or activated carbon) present within the capacitance layer is greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 84 wt %, greater than or equal to 85 wt %, or greater than or equal to 90 wt % versus the total weight of the capacitance layer. In certain embodiments, the total amount of carbon present within the capacitance layer is less than or equal to 95 wt %, less than or equal to 90 wt %, less than or equal to 85 wt %, less than or equal to 84 wt %, less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, or less than or equal to 10 wt % versus the total weight of the capacitance layer. Combinations of the above referenced ranges are also possible (e.g., greater than or equal to 5 wt % and less than or equal to 95 wt %, greater than or equal to 50 wt % and less than or equal to 95 wt %, greater than or equal to 70 wt % and less than or equal to 95 wt %). Other ranges are also possible.

In some embodiments, conductive carbon is present within the capacitance layer in an amount of greater than or equal to 1 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt % versus the total weight of the capacitance layer. In certain embodiments, the conductive carbon is present within the capacitance layer in an amount of less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt % versus the total weight of the capacitance layer. Combinations of the above referenced ranges are also possible (e.g., greater than or equal to 1 wt % and less than or equal to 50 wt %, greater than or equal to 1 wt % and less than or equal to 20 wt %, greater than or equal to 1 wt % and less than or equal to 10 wt %). Other ranges are also possible.

In some embodiments, conductive carbon is present within the capacitance layer in amount of greater than or equal to 1 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt % versus the total weight of carbon present in the capacitance layer. In certain embodiments, the conductive carbon is present within the capacitance layer in an amount of less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt % versus the total weight of carbon present in the capacitance layer. Combinations of the above referenced ranges are also possible (e.g., greater than or equal to 1 wt % and less than or equal to 50 wt %, greater than or equal to 1 wt % and less than or equal to 20 wt %, greater than or equal to 1 wt % and less than or equal to 10 wt %). Other ranges are also possible.

In some embodiments, activated carbon is present within the capacitance layer in amount of greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, or greater than or equal to 90 wt % versus the total weight of the capacitance layer. In certain embodiments, the activated carbon is present within the capacitance layer in an amount of less than or equal to 95 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, or less than or equal to 10 wt % versus the total weight of the capacitance layer. Combinations of the above referenced ranges are also possible (e.g., greater than or equal to 1 wt % and less than or equal to 95 wt %, greater than or equal to 50 wt % and less than or equal to 95 wt %, greater than or equal to 70 wt % and less than or equal to 90 wt %). Other ranges are also possible.

In some embodiments, activated carbon is present within the capacitance layer in amount of greater than or equal to 1 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, or greater than or equal to 90 wt % versus the total weight of carbon present in the capacitance layer. In certain embodiments, the activated carbon is present within the capacitance layer in an amount of less than or equal to 95 wt %, less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, or less than or equal to 5 wt % versus the total weight of carbon present in the capacitance layer. Combinations of the above referenced ranges are also possible (e.g., greater than or equal to 1 wt % and less than or equal to 95 wt %, greater than or equal to 50 wt % and less than or equal to 95 wt %, greater than or equal to 80 wt % and less than or equal to 90 wt %). Other ranges are also possible.

In embodiments in which the capacitance layer includes activated carbon, the capacitance layer may have a desirable specific capacitance. Specific capacitance of a layer or battery component, as used herein, is the absolute capacitance value measured in Farad (F) as determined by the IEC 62576 standard, divided by the mass of activated carbon (g) in the layer or battery component. In some embodiments, the specific capacitance of a layer (e.g., a capacitance layer) or battery component described herein may be greater than or equal to 1 F/g, greater than or equal to 5 F/g, greater than or equal to 10 F/g, greater than or equal to 20 F/g, greater than or equal to 30 F/g, greater than or equal to 40 F/g, greater than or equal to 50 F/g, greater than or equal to 60 F/g, greater than or equal to 70 F/g, greater than or equal to 80 F/g, or greater than or equal to 90 F/g. In some embodiments, the specific capacitance may be less than or equal to 100 F/g, less than or equal to 90 F/g, less than or equal to 80 F/g, less than or equal to 70 F/g, less than or equal to 60 F/g, less than or equal to 50 F/g, less than or equal to 40 F/g, less than or equal to 30 F/g, less than or equal to 20 F/g, or less than or equal to 10 F/g. Combinations of the above referenced ranges are also possible (e.g., greater than or equal to 20 F/g and less than or equal to 80 F/g, greater than or equal to 20 F/g and less than or equal to 60 F/g). Other ranges are also possible.

As described herein, in some embodiments, the capacitance layer comprises a binder. Non-limiting examples of suitable binder material for the capacitance layer include PTFE, CMC, SBR, acrylic, PVDF, and combinations thereof. The binder may be useful for, for example, binding the conductive carbon and/or the activated carbon to at least a portion of the plurality of fibers in the capacitance layer.

In some embodiments, the binder is present within the capacitance layer in amount of greater than or equal to 1 wt %, greater than or equal to 5 wt %, greater than or equal to 10 wt %, greater than or equal to 20 wt %, greater than or equal to 30 wt %, or greater than or equal to 40 wt % versus the total weight of the capacitance layer. in certain embodiments, the binder is present within the capacitance layer in an amount of less than or equal to 50 wt %, less than or equal to 40 wt %, less than or equal to 30 wt %, less than or equal to 20 wt %, less than or equal to 10 wt %, less than or equal to 5 wt %, or less than or equal to 2 wt % versus the total weight of the capacitance layer. Combinations of the above referenced ranges are also possible (e.g., greater than or equal to 1 wt % and less than or equal to 50 wt %, greater than or equal to 1 wt % and less than or equal to 30 wt %, greater than or equal to 1 wt % and less than or equal to 20 wt %). Other ranges are also possible.

In certain embodiments, the capacitance layer comprises a hydrogen suppressant. Non-limiting examples of hydrogen suppressants suitable for use in a capacitance layer include oxides, hydroxides, sulfates (e.g., sulfates of lead, zinc, cadmium, bismuth, and/or silver), tin, titanium, cobalt, antimony, and combinations thereof. The hydrogen suppressants may be present in the capacitance layer in any suitable amount. In some embodiments, the hydrogen suppressant is present in the capacitance layer in an amount of greater than or equal to 0.1 wt %, greater than or equal to 0.2 wt %, greater than or equal to 0.3 wt %, greater than or equal to 0.4 wt %, greater than or equal to 0.5 wt %, greater than or equal to 0.6 wt %, greater than or equal to 0.8 wt %, greater than or equal to 1 wt %, greater than or equal to 1.2 wt %, greater than or equal to 1.5 wt %, greater than or equal to 2 wt %, greater than or equal to 3 wt %, greater than or equal to 4 wt %, greater than or equal to 5 wt %, greater than or equal to 6 wt %, greater than or equal to 7 wt %, greater than or equal to 8 wt %, or greater than or equal to 9 wt % versus the total weight of the capacitance layer. In certain embodiments, the hydrogen suppressant is present in the capacitance layer in an amount less than or equal to 10 wt %, less than or equal to 9 wt %, less than or equal to 8 wt %, less than or equal to 7 wt %, less than or equal to 6 wt %, less than or equal to 5 wt %, less than or equal to 4 wt %, less than or equal to 3 wt %, less than or equal to 2 wt %, less than or equal to 1.5 wt %, less than or equal to 1.2 wt %, less than or equal to 1 wt %, less than or equal to 0.8 wt %, less than or equal to 0.6 wt %, less than or equal to 0.5 wt %, less than or equal to 0.4 wt %, less than or equal to 0.3 wt %, or less than or equal to 0.2 wt % versus the total weight of the capacitance layer. Combinations of the above-referenced ranges are possible (e.g., greater than or equal to 0.1 wt % and less than or equal to 10 wt %, greater than or equal to 0.1 wt % and less than or equal to 5 wt %, greater than or equal to 0.1 wt % and less than or equal to 2 wt %). Other ranges are also possible.

The capacitance layers described herein may have desirable properties including a particular electrical resistivity and/or a particular electrical conductivity. In some embodiments, the electrical resistivity of the capacitance layer may be greater than or equal to 0.001 ohm, greater than or equal to 0.005 ohm, greater than or equal to 0.01 ohm, greater than or equal to 0.05 ohm, greater than or equal to 0.1 ohm, greater than or equal to 0.5 ohm, greater than equal to 1 ohm, greater than or equal to 2 ohm, greater than or equal to 3 ohm, greater than or equal to 4 ohm, greater than or equal to 5 ohm, greater than equal to 6 ohm, greater than or equal to 7 ohm, greater than or equal to 8 ohm, or greater than or equal to 9 ohm. In certain embodiments, the electrical resistivity of the capacitance layer is less than or equal to 10 ohm, less than or equal to 9 ohm, less than or equal to 8 ohm, less than or equal to 7 ohm, less than or equal to 6 ohm., less than or equal to 5 ohm, less than or equal to 4 ohm, less than or equal to 3 ohm, less than or equal to 2 ohm, less than or equal to 1 ohm, less than or equal to 0.5 ohm, less than or equal to 0.1 ohm, or less than or equal to 0.005 ohm. Combinations of the above-referenced ranges are also possible (e.g. greater than or equal to 0.001 ohm and less than or equal to 10 ohm, greater than or equal to 0.001 ohm and less than or equal to 2 ohm), Other ranges are also possible. Electrical resistivity may be measured according to testing standard IEC 62576 Ed. 1.0 b:2009.

In certain embodiments, the electrical conductivity of the capacitance layer may be greater than or equal to 0.1 S/m, greater than or equal to 0.2 S/m, greater than or equal to 0.5 S/m, greater than or equal to 1 S/m, greater than or equal to 2 S/m, greater than or equal to 5 S/m., greater than or equal to 10 S/m, greater than or equal to 25 S/m, greater than or equal to 50 S/m, greater than or equal to 75 S/m, greater than or equal to 100 S/m, greater than or equal to 150 S/m, greater than or equal to 200 S/m, greater than or equal to 250 S/m, greater than or equal to 500 S/m, greater than or equal to 600 S/m, greater than or equal to 750 S/m, greater than or equal to 800 S/m, or greater than or equal to 900 S/m. In certain embodiments, the electrical conductivity of the capacitance layer is less than or equal to 1000 S/m, less than or equal to 900 S/m, less than or equal to 800 S/m, less than or equal to 750 S/m, less than or equal to 600 S/m., less than or equal to 500 S/m, less than or equal to 250 S/m, less than or equal to 150 S/m, less than or equal to 100 S/m, less than or equal to 75 S/m, less than or equal to 50 S/m, less than or equal to 25 S/m, less than or equal to 10 S/m, less than or equal to 5 S/m, less than or equal to 2 S/m, less than or equal to 1 S/m, less than or equal to 0.5 S/m, or less than or equal to 0.2 S/m. Combinations of the above-referenced ranges are possible (e.g., greater than or equal to 0.1 S/m and less than or equal to 1000 S/m, greater than or equal to 0.2 S/m and less than or equal to 1000 S/m). Other ranges are also possible. Electrical conductivity may be determined from the electrical resistivity as measured according to testing standard IS 6071-1986 IEC 62576.

In an exemplary embodiment, the capacitance layer comprises a plurality of fibers (e.g., a plurality of glass fibers), conductive carbon, and activated carbon. In some embodiments, the capacitance layer may be a stand-alone layer in a battery. For example, in some cases, the capacitance layer may be formed separately from the remaining components of the battery and then positioned adjacent one or more of the components in the battery. In some embodiments, the ratio of activated carbon to conductive carbon in the capacitance layer is greater than or equal to 90:10 and less than or equal to 94:6. In some embodiments, the total carbon (e.g., comprising activated carbon and conductive carbon) is present in the capacitance layer in an amount of greater than or equal to 80 wt % and less than or equal to 90 wt % (e.g., greater than or equal to 84 wt %) versus the total weight of the capacitance layer. In some embodiments, the plurality of fibers (e.g., the plurality of glass fibers) are present within the capacitance layer in an amount of greater than 0 wt % and less than or equal to 95 wt % (or another suitable range described herein) versus the total weight of the capacitance layer. In some embodiments, capacitance layer includes both fine glass fibers (e.g., microglass fibers) and coarse glass fibers (e.g., chopped strand fibers). The ratio of fine glass fibers (e.g., microglass fibers) to coarse glass fibers (e.g., chopped strand fibers) in the capacitance layer may be, for example, greater than or equal to 10:90 and less than or equal to 90:10 (or another suitable range described herein). In some embodiments, a binder may be present in the capacitance layer in an amount less than or equal to 5 wt % and greater than or equal to 1 wt % (e.g., less than or equal to 2 wt %) versus the total weight of the capacitance layer. In some embodiments, a hydrogen suppressant is present in the capacitance layer in an amount of greater than or equal to 0.1 wt % and less than or equal to 10 wt % versus the total weight of the capacitance layer. Other configurations and ranges are also possible.

As noted above, a battery component described herein (or fiber layer of the battery component) may be used in a battery such as a lead acid battery. The battery may comprise a negative plate, a positive plate, and a battery component (e.g., including a fiber layer described herein). In some embodiments, the battery component can be disposed between the negative and positive plates. In some embodiments, the battery component can be combined with a battery grid to form a part of the plate. In some embodiments, the battery grid may be punched or expanded. In an exemplary embodiment, the battery grid is a lead grid (e.g., a lead alloy grid).

The battery component may be applied to the negative plate and/or the positive plate. Once applied, the battery component (e.g., the pasting paper) is integrated into the battery plate and becomes part of the electrode.

It is to be understood that the other components of the battery that are not explicitly discussed herein can be conventional battery components. Positive plates and negative plates can be formed of conventional lead acid battery plate materials. For example, in container formatted batteries, plates can include grids that include a conductive material, which can include, but is not limited to, lead, lead alloys, graphite, carbon, carbon foam, titanium, ceramics (such as Ebonex®), laminates and composite materials. The grids are typically pasted with active materials. The pasted grids are typically converted to positive and negative battery plates by a process called "formation." Formation involves passing an electric current through an assembly of alternating positive and negative plates with separators between adjacent plates while the assembly is in a suitable electrolyte (e.g., to convert pasted oxide to active materials).

As a specific example, positive plates may contain lead dioxide as the active material, and negative plates may contain lead as the active material. Plates can also contain one or more reinforcing materials, such as chopped organic fibers (e.g., having lu an average length of 0.125 inch or more), chopped glass fibers, metal sulfate(s) (e.g., nickel sulfate, copper sulfate), red lead (e.g., a $Pb_3O_4$-containing material), litharge, paraffin oil, and/or expander(s). In some embodiments, an expander contains barium sulfate, carbon black and lignin sulfonate as the primary components. The components of the expander(s) can be pre-mixed or not pre-mixed. Expanders are commercially available from, for example, Hammond Lead Products (Hammond, Ind.) and Atomized Products Group, Inc. (Garland, Tex.).

An example of a commercially available expander is the Texex® expander (Atomized Products Group, Inc.). In certain embodiments, the expander(s), metal sulfate(s) and/or paraffin are present in positive plates, but not negative plates. In some embodiments, positive plates and/or negative plates contain fibrous material or other glass compositions.

A battery can be assembled using any desired technique. For example, a battery component may be cut into a sheet and may be placed between two plates, or the component may be wrapped around the plates (e.g., positive electrode, negative electrode). The positive plates, negative plates and component are then assembled in a case using conventional lead acid battery assembly methods. The battery component may be used, in some embodiments, as a pasting paper and/or a conductive layer or capacitance layer. In some embodiments, the battery component is adjacent (e.g., directly adjacent) an electrode of the battery (e.g., the positive electrode, the negative electrode). For example, in one set of embodiments, the battery component is applied as a pasting paper to the battery plate and is integrated into the plate, making it a part of the electrode. In certain embodiments, the components are compressed after they are assembled in the case, i.e., the thickness of the components are reduced after they are placed into the case. An electrolyte (e.g., sulfuric acid) is then disposed in the case. It should be understood that the shapes (e.g., planar) of the battery components described herein are non-limiting and the battery components described herein may have any suitable shape.

In some embodiments, a battery component described herein may be used, for example, in combination with (e.g., positioned adjacent) a leaf separator, an envelope separator (i.e., the separator is sealed on three sides), a z-fold separator, a sleeve separator, a corrugated separator, C-wrap separator, or a U-wrap separator. In certain embodiments, the separator is a non-woven glass separator.

In some embodiments, the battery components (e.g., including the fiber layers described herein) may be used in lead acid batteries including valve-regulated batteries (e.g., absorbent glass mat batteries). In a valve-regulated lead acid (VRLA) battery, for example, the internal environment is controlled by a valve for venting, the valve vents gas (e.g., hydrogen, oxygen) from the battery as pressure builds. The valve is a pressure relief valve, only opening when the internal battery pressure reaches a threshold. When the internal pressure in the battery is below this threshold the valve prevents either gas from escaping. Generated $O_2$ can diffuse from the positive electrode to the negative electrode. Discharging the negative electrode generally enables recombination of the oxygen ions in the electrolyte, which acts to suppress hydrogen generation. The ability of a valve regulated lead acid battery (VRLA) to recombine oxygen governs several facets of the battery performance and safety. Hydrogen is an explosive gas, and thus recombination of oxygen is important to reduce the potential of an explosion. A low level of recombination of oxygen also negatively affects the charge acceptance of the battery. The battery separators described herein may facilitate the recombination of oxygen, reduces hydrogen formation, and thus increase the efficiency and performance of the battery.

Fiber layers described herein may be produced using suitable processes, such as a wet laid process. In general, a wet laid process involves mixing together fibers of one or more type; for example, glass fibers of one type may be mixed together with glass fibers of another type, and/or with fibers of a different type (e.g., fibrillated fibers), to provide a fiber slurry. The slurry may be, for example, an aqueous-based slurry. In certain embodiments, fibers, are optionally stored separately, or in combination, in various holding tanks prior to being mixed together.

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components (e.g., inorganic particles) may also be introduced into the mixture. Furthermore, it should be appreciated that other combinations of fibers types may be used in fiber mixtures, such as the fiber types described herein.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable ranae, such as for example, between about 0.1% and 0.5% by weight.

In some embodiments in which additives (e.g., carbon-based additives such as conductive carbon and activated carbon) are included in the fiber web such as for formation of a pasting paper battery component, the additives may be added to the fiber slurry in any suitable amount. Additional components (e.g., one or more retention aids) may also be added to the slurry. The additives and/or additional components may be added to the fiber slurry at any stage before the fiber slurry enters the headbox. In other embodiments, such as for a capacitance paper batter component, additives (e.g., carbon-based additives such as conductive carbon and activated carbon) may be added after formation of the fiber web.

In some cases, the pH of the fiber slurry may be adjusted as desired. For instance, fibers of the slurry may be dispersed under acidic or neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder/round former, or an inclined wire fourdrinier.

In some embodiments two or more layers of a battery component may be formed separately, and combined by any suitable method such as lamination, collation, or by use of adhesives. The two or more layers may be formed using different processes, or the same process. For example, each of the layers may be independently formed by a wet laid process, a non-wet laid process, or any other suitable process.

In some embodiments, two or more layers may be formed by the same process. In some instances, the two or more layers may be formed simultaneously.

Different layers may be adhered together by any suitable method. For instance, layers may be adhered by an adhesive and/or melt-bonded to one another on either side. Lamination and calendering processes may also be used. In some embodiments, an additional layer may be formed from any type of fiber or blend of fibers via an added headbox or a coater and appropriately adhered to another layer.

In some embodiments, the battery component may be formed at least in part by coating a pre-formed fiber layer (e.g., comprising a plurality of fibers, such as a fiber web described herein) with a slurry (e.g., comprising activated and conductive carbon) and/or a paste on at least a portion of the fiber layer.

Any suitable coating method may be used to form a coating on the fiber layer. In some embodiments, the coating or slurry may be applied to the fiber layer using a non-compressive coating technique. The non-compressive coating technique may coat the fiber layer, while not substantially decreasing the thickness of the layer. In other embodiments, the coating or slurry may be applied to the fiber layer using a compressive coating technique. Non-limiting examples of coating methods include the use of a slot die coater, gravure coating, size press coating (e.g., a two roll-type or a metering blade type size press coater), film press coating, blade coating, roll-blade coating, air knife coating, roll coating, foam application, reverse roll coating, bar coating, curtain coating, champlex coating, brush coating, Bill-blade coating, short dwell-blade coating, lip coating, gate roll coating, gate roll size press coating, lab coating, melt coating, dip coating, knife roll coating, spin coating, spray coating, and saturation impregnation. Other coating methods are also possible.

The coating or slurry may coat any suitable portion of the fiber layer. In some embodiments, the coating or slurry may be formed such that the surfaces of the fiber layer are coated without substantially coating the interior of the fiber layer. In some instances, a single surface of the fiber layer may be coated. For example, a top surface of the fiber layer may be coated. In other instances, more than one surface of the fiber layer may be coated (e.g., the top and bottom surfaces). In other embodiments, at least a portion of the interior of the fiber layer may be coated without substantially coating at least one surface of fiber layer. The coating or slurry may also be formed such that at least one surface of the fiber layer and the interior of the fiber layer are coated. In some embodiments, the entire fiber layer is coated. For example, the fibers of the fiber web may be impregnated with the coating or slurry in some embodiments.

In an exemplary embodiment, a battery component (e.g., such as a pasting paper) for use in an electrochemical cell has a total wt % of carbon (e.g., comprising activated carbon and conductive carbon) greater than or equal to 50 wt % and less than or equal to 90 wt % (e.g., greater than or equal to 80 wt % and less than or equal to 90 wt %) versus the total weight of the battery component. In an exemplary configuration, the total wt % of carbon present in the battery component may be 90 wt % versus the total weight of the battery component. In some cases, the battery component may comprise a plurality of fine glass fibers in an amount greater than or equal to 3 wt % and less than or equal to 6 wt % versus the total battery component weight, a plurality of coarse glass fibers in an amount greater than or equal to 3 wt % and less than or equal to 6 wt % versus the total battery component weight, a plurality of fibrillated fibers in an amount greater than or equal to 0.1 wt % and less than or equal to 1.5 wt % versus the total battery component weight, a plurality of bicomponent fibers in an amount greater than or equal to 0 wt % and less than or equal to 1 wt % versus the total battery component weight, a resin in an amount greater than or equal to 0.1 wt % and less than or equal to 1.5 wt % versus the total battery component weight, and a binder in an amount greater than or equal to 1 wt % and less than or equal to 2 wt % versus the total battery component weight.

EXAMPLES

The following examples are intended to illustrate certain embodiments of the present invention, but are not to be construed as limiting and do not exemplify the full scope of the invention.

Example 1

The following example demonstrates the formation of a pasting paper battery component for use in an electrochemical cell, according to some embodiments.

The pasting paper battery component (Sample 1), included:

A plurality of fine glass fibers (1.5 micron avg. diameter): 41 wt %

A plurality of coarse glass fibers (2.6 micron avg. diameter): 41 wt %

A plurality of coarse glass fibers (13.5 micron avg. diameter): 7 wt %

A plurality of bicomponent (PET core/PE sheath) fibers 1.3 dtex, 6 mm long: 2 wt %

A plurality of fibrillated Cellulosic (cedar pulp) fibers (40 micron avg. fiber diameter): 7 wt %; and Resin: 2 wt %.

Figure 3:
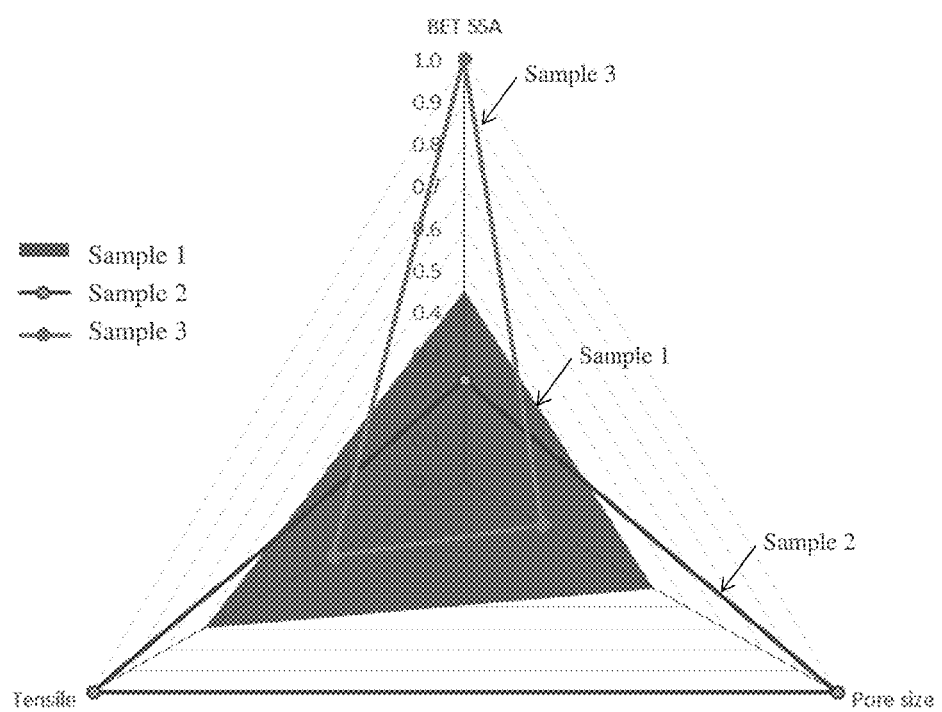
FIG. 3 is a plot illustrating the relationship between dry tensile strength, mean pore size, and specific surface area for a battery component according to some embodiments.

FIG. 3 shows a plot of the normalized performance characteristics (specific surface area ("SSA"), pore size ("pore size"), and dry tensile strength ("tensile")) of the battery component described above (Sample 1) as compared to two comparative battery components (Sample 2 and Sample 3). The first comparative battery component (Sample 2) included:

A plurality of coarse glass fibers (8 micron avg. diameter): 47.5 wt %

A plurality of coarse glass fibers (chopped, 13.5 micron avg. diameter): 12 wt %

A plurality of coarse glass fibers (3 micron avg. diameter): 23.5 wt %

A plurality of fibrillated cellulosic fibers: 17 wt %

The second comparative battery component (Sample 3) included:

A plurality of fine glass fibers (0.8 micron avg. diameter): 80 wt %

A plurality of coarse glass fibers (3 micron avg. diameter): 20 wt %

The normalized value was obtained by dividing the measured value of the property for each battery component by the maximum value for that property for all samples (e.g., the pore size for each battery component was divided by the maximum pore size of all battery components). The pasting paper battery component (Sample 1) demonstrates a desirable balance between specific surface area, dry tensile strength, and mean pore size (e.g., generally resulting in a desirable balance between resistance to acid stratification, ease of processability, and paste adhesion). By contrast, Sample 2 had a relatively high mean pore size and relatively high dry tensile strength, with relatively low specific surface area compared to Sample 1. Similarly, Sample 3 had relatively high specific surface area, with relatively low mean pore size and relatively low dry tensile strength compared to Sample 1.

Example 2

The following example demonstrates the formation of a capacitance layer for use in an electrochemical cell, according to some embodiments.

Capacitance layers with varying formulations (varying amount of activated carbon (AC) to conductive carbon (CC) ratio) were formed and tested.

Sample 1 included a ratio of 100:0 AC:CC.
Sample 2 included a ratio of 0:100 AC:CC.
Sample 3 included a ratio of 50:50 AC:CC.
Sample 4 included a ratio of 89.6:10.4 AC:CC.
Sample 5 included a ratio of 93.75:6.25 AC:CC.

PTFE binder with water/isopropanol as a solvent/dispersant was used for all samples. Each capacitance layer was laminated to a fiber layer comprising a plurality of glass fibers such that the AC/CC/binder was embedded into the fiber layer. Water/isopropanol was evaporated while drying the capacitance layer. In this form the glass scrim was about 10% (wt %) of the total weight of the capacitance layer. The binder was present in an amount of about 3-4 wt % versus the total weight of the capacitance layer. The weight percentage of AC and CC in each sample was:

Sample 1: 86 wt % AC; 0 wt % CC.
Sample 2: 0 wt % AC; 86 wt % CC.
Sample 3: 43 wt % AC; 43 wt % CC.
Sample 4: 77.5 wt % AC; 9 wt % CC.
Sample 5: 81 wt % AC; 5.5 wt % CC.

Symmetric capacitors were made for these five samples and their performance evaluation using specific capacitance and Equivalent Series Resistance (ESR) values were measured. Samples 4 and 5 demonstrated the best performing formulations with high specific capacitance and low ESR. Specific capacitance values in excess of 40 F/g and ESR values as low as 0.13 Ohms were obtained for Samples 4 and 5. Specific capacitance and ESR for Samples 1-3 were not determined due to poor electrical characteristics. For example, Sample 1 having 86 wt % AC had poor structural interconnections and poor electrical behavior (e.g., the device was unable to be fully charged). Similarly, Samples 2 and 3 were unable to be charged and had no significant specific capacitance.

What is claimed is:

1. A battery component, comprising:
    a plurality of fine glass fibers having an average fiber diameter of less than 2 microns, wherein the plurality of fine glass fibers are present in an amount greater than or equal to 30 wt % and less than or equal to 60 wt % versus the total weight of the battery component;
    a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component;
    a plurality of fibrillated fibers present in an amount greater than or equal to 1 wt % and less than or equal to 15 wt % versus the total weight of the battery component;
    a resin present in an amount greater than or equal to 1 wt % and less than or equal to 10 wt % versus the total weight of the battery component; and
    a plurality of bicomponent fibers present in an amount of greater than 0 wt % and less than or equal to 8 wt % versus the total weight of the battery component,
    wherein the battery component has a Cobb parameter of greater than or equal to 50 gsm.

2. A battery component as in claim 1, wherein the plurality of fine glass fibers have an average fiber diameter of less than or equal to 1 micron, wherein the plurality of coarse glass fibers have an average fiber diameter of greater than 5 microns, wherein the battery component has a basis weight of greater than or equal to 10 g/m$^2$ and less than or equal to 200 g/m$^2$, wherein the battery component has a specific surface area of greater than or equal to 0.2 m$^2$/g and less than or equal to 5 m$^2$/g, and wherein the battery component has a mean pore size of greater than or equal to 0.1 microns and less than or equal to 15 microns.

3. A battery component, comprising:
    a plurality of fine glass fibers having an average fiber diameter of less than 2 microns, wherein the plurality of fine glass fibers are present in an amount greater than or equal to 30 wt % and less than or equal to 60 wt % versus the total weight of the battery component;
    a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component;
    a plurality of fibrillated fibers present in an amount greater than or equal to 1 wt % and less than or equal to 15 wt % versus the total weight of the battery component; and
    a resin present in an amount greater than or equal to 1 wt % and less than or equal to 10 wt % versus the total weight of the battery component,
    wherein the battery component has an air permeability of greater than or equal to 1 CFM and less than or equal to 1000 CFM, and
    wherein the battery component has a Cobb parameter of greater than or equal to 50 gsm.

4. A battery plate, comprising:
a lead grid; and
a battery component as in claim 3.

5. A battery component as in claim 3, wherein the battery component comprises activated carbon and conductive carbon, and wherein the ratio of activated carbon to conductive carbon is greater than or equal to 90:10 and less than or equal to 94:6.

6. A battery component as in claim 3, wherein the battery component comprises a hydrogen suppressant in an amount of less than or equal to 2 wt % versus the total weight of the battery component.

7. A battery component as in claim 3, wherein the plurality of fine glass fibers have an average fiber diameter of less than or equal to 1 micron.

8. A battery component as in claim 3, wherein the plurality of coarse glass fibers have an average fiber diameter of greater than 5 microns.

9. A battery component as in claim 3, wherein the plurality of fibrillated fibers have a Canadian Standard Freeness (CSF) of greater than or equal to 20 CSF and less than or equal to 650 CSF.

10. A battery component as in claim 3, wherein the plurality of fibrillated fibers comprise cellulose-based fibers, acrylics, liquid crystalline polymers, polyoxazoles, aramids, p-aramids, polyethylenes, polyesters, polyamides, cotton, polyolefins, and/or olefins.

11. A battery component as in claim 3, wherein the resin is a hydrophobic resin.

12. A battery component as in claim 3, wherein the battery component has a basis weight of greater than or equal to 10 $g/m^2$ and less than or equal to 200 $g/m^2$.

13. A battery component as in claim 3, wherein the battery component has a specific surface area of greater than or equal to 0.2 $m^2/g$ and less than or equal to 5 $m^2/g$.

14. A battery component as in claim 3, wherein the battery component has a mean pore size of greater than or equal to 0.1 microns and less than or equal to 15 microns.

15. A battery component as in claim 3, wherein the battery component has a dry tensile strength of greater than or equal to 0.1 pounds per inch and less than or equal to 15 pounds per inch.

16. A lead acid battery comprising,
a negative plate;
a positive plate; and
a battery component as in claim 3 disposed between the negative and positive plates.

17. A battery component as in claim 3, wherein the plurality of fine glass fibers have an average fiber diameter of less than or equal to 1 micron, wherein the plurality of coarse glass fibers have an average fiber diameter of greater than 5 microns, wherein the battery component has a basis weight of greater than or equal to 10 $g/m^2$ and less than or equal to 200 $g/m^2$, wherein the battery component has a specific surface area of greater than or equal to 0.2 $m^2/g$ and less than or equal to 5 $m^2/g$, and wherein the battery component has a mean pore size of greater than or equal to 0.1 microns and less than or equal to 15 microns.

18. A battery component, comprising:
a plurality of fine glass fibers having an average fiber diameter of less than 2 microns, wherein the plurality of fine glass fibers are present in an amount greater than or equal to 30 wt % and less than or equal to 60 wt % versus the total weight of the battery component;
a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component;
a plurality of fibrillated fibers present in an amount greater than or equal to 1 wt % and less than or equal to 15 wt % versus the total weight of the battery component; and
a resin present in an amount greater than or equal to 1 wt % and less than or equal to 10 wt % versus the total weight of the battery component,
wherein the resin is hydrophobic, and
wherein the battery component has a Cobb parameter of greater than or equal to 50 gsm.

19. A battery component as in claim 18, wherein the plurality of fine glass fibers have an average fiber diameter of less than or equal to 1 micron, wherein the plurality of coarse glass fibers have an average fiber diameter of greater than 5 microns, wherein the battery component has a basis weight of greater than or equal to 10 $g/m^2$ and less than or equal to 200 $g/m^2$, wherein the battery component has a specific surface area of greater than or equal to 0.2 $m^2/g$ and less than or equal to 5 $m^2/g$, and wherein the battery component has a mean pore size of greater than or equal to 0.1 microns and less than or equal to 15 microns.

20. A battery component, comprising:
a plurality of fine glass fibers having an average fiber diameter of less than 2 microns;
a plurality of coarse glass fibers having an average fiber diameter of greater than or equal to 2 microns; and
a plurality of fibrillated fibers,
wherein the battery component has a surface area of greater than or equal to 0.5 $m^2/g$ and less than or equal to 100 $m^2/g$,
wherein the battery component has a mean pore size of greater than or equal to 0.1 microns and less than or equal to 15 microns,
wherein the battery component has a dry tensile strength in the machine direction of greater than or equal to 0.1 lbs. per inch and less than or equal to 15 lbs. per inch, and
wherein the battery component has a Cobb parameter of greater than or equal to 50 gsm.

21. A battery component as in claim 20, wherein the plurality of fine glass fibers have an average fiber diameter of less than or equal to 1 micron, wherein the plurality of coarse glass fibers have an average fiber diameter of greater than 5 microns, wherein the battery component has a basis weight of greater than or equal to 10 $g/m^2$ and less than or equal to 200 $g/m^2$, wherein the battery component has a specific surface area of greater than or equal to 0.2 $m^2/g$ and less than or equal to 5 $m^2/g$, and wherein the battery component has a mean pore size of greater than or equal to 0.1 microns and less than or equal to 15 microns.

22. A battery component, comprising:
a plurality of fine glass fibers having an average fiber diameter of less than 2 microns, wherein the plurality of fine glass fibers are present in an amount greater than or equal to 30 wt % and less than or equal to 60 wt % versus the total weight of the battery component;
a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component;
a plurality of fibrillated fibers present in an amount greater than or equal to 1 wt % and less than or equal to 15 wt % versus the total weight of the battery component;

a resin present in an amount greater than or equal to 1 wt % and less than or equal to 10 wt % versus the total weight of the battery component; and a plurality of bicomponent fibers present in an amount of greater than 0 wt % and less than or equal to 8 wt % versus the total weight of the battery component, wherein the battery component comprises a hydrogen suppressant in an amount of less than or equal to 2 wt % versus the total weight of the battery component.

23. A battery component, comprising:

a plurality of fine glass fibers having an average fiber diameter of less than 2 microns, wherein the plurality of fine glass fibers are present in an amount greater than or equal to 30 wt % and less than or equal to 60 wt % versus the total weight of the battery component;

a plurality of coarse glass fibers having an average fiber diameter of greater than or equal to 2 microns, wherein the plurality of coarse glass fibers are present in an amount greater than or equal to 30 wt % and less than or equal to 60 wt % versus the total weight of the battery component;

a plurality of fibrillated fibers present in an amount greater than or equal to 1 wt % and less than or equal to 15 wt % versus the total weight of the battery component;

a resin present in an amount greater than or equal to 1 wt % and less than or equal to 10 wt % versus the total weight of the battery component; and a plurality of bicomponent fibers present in an amount of greater than 0 wt % and less than or equal to 8 wt % versus the total weight of the battery component, wherein the battery component comprises activated carbon and conductive carbon, and wherein the ratio of activated carbon to conductive carbon is greater than or equal to 90:10 and less than or equal to 94:6.

* * * * *